(12) United States Patent
Cohen et al.

(10) Patent No.: US 11,587,245 B2
(45) Date of Patent: Feb. 21, 2023

(54) REAL TIME CALIBRATION FOR TIME-OF-FLIGHT DEPTH MEASUREMENT

(71) Applicant: Magic Leap, Inc., Plantation, FL (US)

(72) Inventors: David Cohen, Nesher (IL); Assaf Pellman, Bet Yehoshua (IL); Shai Mazor, Binyamina (IL); Erez Tadmor, Atlit (IL); Giora Yahav, Haifa (IL)

(73) Assignee: Magic Leap, Inc., Plantation, FL (US)

( * ) Notice: Subject to any disclaimer, the term of this patent is extended or adjusted under 35 U.S.C. 154(b) by 298 days.

(21) Appl. No.: 16/936,345

(22) Filed: Jul. 22, 2020

(65) Prior Publication Data

US 2021/0004975 A1 Jan. 7, 2021

Related U.S. Application Data

(63) Continuation of application No. 15/721,640, filed on Sep. 29, 2017, now Pat. No. 10,762,651.

(Continued)

(51) Int. Cl.
*G01S 7/497* (2006.01)
*G01S 7/481* (2006.01)
(Continued)

(52) U.S. Cl.
CPC ............. *G06T 7/521* (2017.01); *G01S 7/483* (2013.01); *G01S 7/4813* (2013.01); *G01S 7/497* (2013.01);
(Continued)

(58) Field of Classification Search
None
See application file for complete search history.

(56) References Cited

U.S. PATENT DOCUMENTS

| 9,330,464 | B1 | 5/2016 | Ackerman et al. |
| 10,762,651 | B2 | 9/2020 | Cohen et al. |

(Continued)

FOREIGN PATENT DOCUMENTS

| CN | 102622745 A | 8/2012 |
| CN | 105518480 A | 4/2016 |

(Continued)

OTHER PUBLICATIONS

EP17857610.4, "Extended European Search Report", dated Sep. 13, 2019, 9 pages.

(Continued)

*Primary Examiner* — Eric L Bolda
(74) *Attorney, Agent, or Firm* — Kilpatrick Townsend & Stockton LLP

(57) ABSTRACT

A method for determining a distance to a target object includes transmitting light pulses to illuminate the target object and sensing, in a first region of a light-sensitive pixel array, light provided from an optical feedback device that receives a portion of the transmitted light pulses. The feedback optical device includes a preset reference depth. The method includes calibrating time-of-flight (TOF) depth measurement reference information based on the sensed light in the first region of the pixel array. The method further includes sensing, in a second region of the light-sensitive pixel array, light reflected from the target object from the transmitted light pulses. The distance of the target object is determined based on the sensed reflected light and the calibrated TOF measurement reference information.

20 Claims, 22 Drawing Sheets

Related U.S. Application Data

(60) Provisional application No. 62/402,770, filed on Sep. 30, 2016.

(51) Int. Cl.
    *G01S 17/89*       (2020.01)
    *G01S 7/483*       (2006.01)
    *G01S 17/08*       (2006.01)
    *G06T 7/521*       (2017.01)
    *G01S 17/894*     (2020.01)

(52) U.S. Cl.
    CPC .............. *G01S 17/08* (2013.01); *G01S 17/89* (2013.01); *G01S 17/894* (2020.01); *G06T 2207/10004* (2013.01)

(56) References Cited

U.S. PATENT DOCUMENTS

| | | |
|---|---|---|
| 2004/0233416 A1 | 11/2004 | Doemens et al. |
| 2013/0278576 A1 | 10/2013 | Lee et al. |
| 2015/0109414 A1 | 4/2015 | Adam et al. |
| 2015/0193938 A1 | 7/2015 | Freedman et al. |
| 2015/0302570 A1 | 10/2015 | Shirakyan et al. |
| 2016/0061941 A1 | 3/2016 | Guo et al. |
| 2016/0119611 A1 | 4/2016 | Hall et al. |
| 2016/0124089 A1 | 5/2016 | Meinherz et al. |
| 2018/0096489 A1 | 4/2018 | Cohen et al. |
| 2019/0147624 A1 | 5/2019 | Plank et al. |

FOREIGN PATENT DOCUMENTS

| | | |
|---|---|---|
| JP | 2010061304 A | 3/2010 |
| JP | 2014070936 A | 4/2014 |
| JP | 2019529931 A | 10/2019 |
| KR | 20040019387 A | 3/2004 |
| WO | 2015128915 A1 | 9/2015 |
| WO | 2018064658 A1 | 4/2018 |

OTHER PUBLICATIONS

PCT/US2017/054719, "International Preliminary Report on Patentability", dated Apr. 11, 2019, 10 pages.
PCT/US2017/054719, "International Search Report and Written Opinion", dated Dec. 11, 2017, 11 pages.
AU2017337124, "First Examination Report", dated Aug. 10, 2021, 4 pages.
EP17857610.4, "Office Action", dated Feb. 23, 2021, 4 pages.
IL265659, "Office Action", English Translation, dated Nov. 30, 2020, 6 pages.
IN201947012732, "First Examination Report", English Translation, dated May 25, 2021, 6 pages.
JP2019-517427, "Notice of Allowance", no English Translation available, dated Apr. 5, 2021, 3 pages.
JP2019-517427, "Office Action", English Translation, dated Oct. 5, 2020, 13 pages.
Application No. AU2017337124, "Second Examination Report", dated Jun. 15, 2022, 3 pages.
Application No. JP2021-078354, Office Action and English Translation, dated Apr. 14, 2022, 5 pages.
Application No. AU2017337124, "Notice of Acceptance", dated Jul. 20, 2022, 3 pages.
Application No. CN201780073708.1, "Office Action", dated Aug. 25, 2022, 11 pages.
Application No. JP2021-078354, "Notice of Allowance", dated Aug. 8, 2022, 3 pages.
Application No. KR10-2019-7012442, "Office Action" and English Translation, dated Jun. 30, 2022, 12 pages.
Application No. KR10-2019-7012442, "Notice of Decision to Grant" and English translation, dated Nov. 24, 2022, 4 pages.
Application No. NZ752168, "First Examination Report", dated Oct. 27, 2022, 3 pages.

REAL TIME CALIBRATION FOR TIME-OF-FLIGHT DEPTH MEASUREMENT

CROSS-REFERENCES TO RELATED APPLICATIONS

This application is a continuation of U.S. patent application Ser. No. 15/721,640, filed on Sep. 29, 2017, now U.S. Pat. No. 10,762,651, issued on Sep. 1, 2020, entitled "REAL TIME CALIBRATION FOR TIME-OF-FLIGHT DEPTH MEASUREMENT," which is a non-provisional of and claims the benefit of and priority to U.S. Provisional Patent Application No. 62/402,770, filed on Sep. 30, 2016, entitled "REAL TIME CALIBRATION FOR TIME-OF-FLIGHT DEPTH MEASUREMENT" the content of which are hereby incorporated by reference in their entirety for all purposes.

FIELD OF THE INVENTION

Embodiments of the present invention relate generally to time-of-flight (TOF) depth measurement systems.

BACKGROUND OF THE INVENTION

A time-of-flight (TOF) camera is a range imaging camera system that resolves distance based on the speed of light, measuring the time-of-flight of a light signal between the camera and the subject for each point of the image. With a time-of-flight camera, the entire scene is captured with each laser or light pulse. Time-of-flight camera products have become popular as the semiconductor devices became fast to support such applications. Direct Time-of-Flight imaging systems measure the direct time-of-flight required for a single laser pulse to leave the camera and reflect back onto the focal plane array. The 3D images can capture complete spatial and temporal data, recording full 3D scenes with a single laser pulse. This allows rapid acquisition and real-time processing of scene information, leading to a wide range of applications. These applications include automotive applications, human-machine interfaces and gaming, measurement and machine vision, industrial and surveillance measurements, and robotics, etc.

The simplest version of a time-of-flight camera uses light pulses or a single light pulse. The illumination is switched on for a short time, the resulting light pulse illuminates the scene and is reflected by the objects in the field of view. The camera lens gathers the reflected light and images it onto the sensor or focal plane array. The time delay between the out-going light and the return light is the time-of-flight, which can be used with the speed of light to determine the distance. A more sophisticated TOF depth measurement can be carried by illuminating the object or scene with light pulses using a sequence of temporal windows and applying a convolution process to the optical signal received at the sensor.

SUMMARY OF THE INVENTION

Conventional time-of-flight depth measurement systems can be susceptible to variations in processes, operating voltages, and thermal conditions. For example, the system might potentially be modified if the thermal conditions (T) or the operating voltages (V) of each of the components were modified. In addition, the TOF measurements can also be affected by the frame rate of the camera. These variations might be dependent on the process (P) of each of the components. Although it might possible to study the nature of the PVT effect and prepare a model to compensate for the errors, this process is time-consuming and may not necessarily provide a full coverage of the physical envelope. Further, a calibration of full range depth measurement is undesirable, because it can take many frames and increases operation overhead.

In order to mitigate the effects of variations in component processing or operating conditions, embodiments of the invention provide a system and method for run-time calibration of TOF depth measurement using an optical feedback device and a small dedicated feedback sensing region in the sensor pixel array. The small number of feedback pixels allows for fast sensing and signal processing, and with the strong feedback illumination, for example, provided by an optical fiber, the number of sampling pulses can be greatly reduced. Many steps of illumination and readout can be carried out in a short time for calibrating a wide range of depth. As a result, the depth calibration can be carried out over a wide range of depth measurement at run-time in each frame without affecting the frame rate of the camera. Isolation between the feedback region and active region of the pixel array is provided to minimize interference. Further, the overhead in power consumption or dedicated feedback pixels is limited.

In some embodiments of the present invention, a time-of-flight imaging system includes an illuminator to transmit light pulses to illuminate a target object for determining a distance, or depth, to the target object. The imaging system has an image sensor with a light-sensitive pixel array to receive optical signals from the light pulses. The pixel arrays include an active region and a feedback region. An optical feedback device directs a portion of the light from the illuminator to the feedback region of the pixel array. The optical feedback device provides a preset reference depth for calibration. The imaging system is configured to transmit light pulses to illuminate a target object and sense, in the feedback region of the pixel array, light from the optical feedback device, using a sequence of shutter windows that includes delay times representing a range of depth. The imaging system is configured to calibrate time-of-flight (TOF) depth measurement reference information based on the sensed light in the feedback region of the pixel array. For TOF depth measurement, the imaging system is configured to sense, in the active region of the light-sensitive pixel array, light reflected from the target object, and to determine the distance of the target object based on the sensed reflected light and the calibrated TOF measurement reference information.

In an embodiment of the above system, the TOF measurement reference information includes a look-up table correlating distance of an object to a ratio between two sampled light signals using two shutters with different time delays.

In some embodiments of the present invention, in a digital camera characterized by a preset frame rate, a method is provided for determining a distance to the target object with distance calibration in a single frame period. The method includes transmitting light pulses to illuminate a target object and sensing, in a first region of a light-sensitive pixel array, light provided from an optical feedback device that receives a portion of the transmitted light pulses. The feedback optical device includes a preset reference depth. The light from the optical feedback device is sampled using a sequence of shutter windows that includes delay times representing a range of distance. The method includes calibrating time-of-flight (TOF) depth measurement reference information based on the sensed light in the first region of the pixel array. The method further includes sensing, in a second region of the light-sensitive pixel array, light reflected from the target object from the transmitted light pulses. The distance of the target object is determined based on the sensed reflected light and the calibrated TOF measurement reference information.

In some embodiments of the present invention, a method for determining a distance to a target object includes transmitting light pulses to illuminate the target object and sensing, in a first region of a light-sensitive pixel array, light provided from an optical feedback device that receives a portion of the transmitted light pulses. The feedback optical device includes a preset reference depth. The method includes calibrating time-of-flight (TOF) depth measurement reference information based on the sensed light in the first region of the pixel array. The method further includes sensing, in a second region of the light-sensitive pixel array, light reflected from the target object from the transmitted light pulses. The distance of the target object is determined based on the sensed reflected light and the calibrated TOF measurement reference information.

The following description, together with the accompanying drawings, will provide further understanding of the nature and advantages of the claimed invention.

DETAILED DESCRIPTION OF SPECIFIC EMBODIMENTS

Embodiments of the present invention provide a system and method that enable TOF depth measurement with calibration to provide high accuracy using optical feedback and fast image processing. A range of depth measurements can be calibrated for each frame with minimal effect on sensor performance and power consumption.

The description below is presented with reference to a series of drawing figures enumerated above. These diagrams are merely examples, and should not unduly limit the scope of the claims herein. In connection with the various aspects illustrated and described, one of ordinary skill in the art would recognize other variations, modifications, and alternatives.

Figure 1:
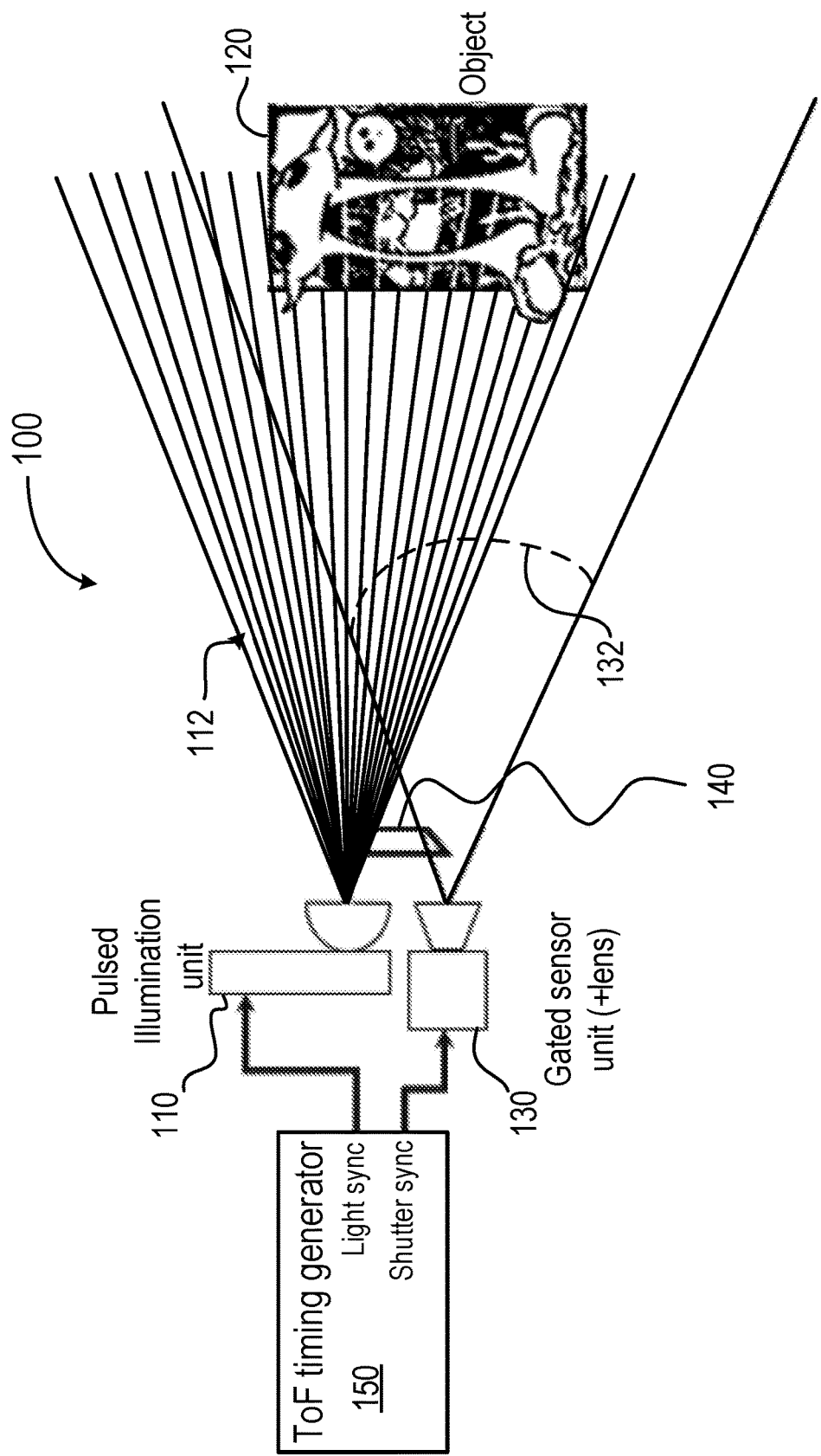
FIG. 1 is a diagram illustrating a time-of-flight (TOF) imaging system for depth measurement according to an embodiment of the present invention.

FIG. 1 is a diagram illustrating a time-of-flight (TOF) imaging system for depth measurement according to an embodiment of the present invention. As shown in FIG. 1, a time-of-flight (TOF) imaging system 100, also referred to as a TOF digital camera, includes an illuminator 110 to transmit light pulses 112 to illuminate a target object 120 for determining a distance to the target object. Illuminator 110 can include a pulsed illumination unit and optics for emitting the light pulses 112 toward the target object. In this example, illuminator 110 is configured to transmit light to the target object using, for example, a laser light source. However, it is understood that other sources of electromagnetic radiation can also be used, for example, infra-red light, radio frequency EM waves, etc. Imaging system 100 also includes an image sensor 130 having a gated sensor unit including a light-sensitive pixel array to receive optical signals from the light pulses in the field of view (FOV) 132 of the sensor lens. The pixel arrays including an active region and a feedback region, as explained below in connection with FIGS. 2A and 2B. Imaging system 100 also has an optical feedback device 140 for directing a portion of the light from the illuminator 110 to the feedback region of the pixel array. The optical feedback device 140 provides a preset reference depth. The preset reference depth can be a fixed TOF length, which can be used to produce a look up table (LUT) that correlates sensed light vs. depth measurement. In some embodiments, the optical feedback device can fold a direct light from the illumination unit into the field of view (FOV) of the lens in the sensor unit. Imaging system 100 further includes a TOF timing generator 150 for providing light synchronization and shutter synchronization signals to the illuminator and the image sensor.

In FIG. 1, TOF imaging system 100 is configured to transmit light pulses to illuminate a target object 120. Imaging system 100 is also configured to sense, in the feedback region of the pixel array, light from the optical feedback device 140, using a sequence of shutter windows that includes delay times representing a range of depth. The range of depth can include the entire range of distance that can be determined by the imaging system. Imaging system 100 calibrates time-of-flight (TOF) depth measurement reference information based on the sensed light in the feedback region of the pixel array. Imaging system 100 is further configured to sense, in the active region of the light-sensitive pixel array, light reflected from the target object, and to determine the distance of the target object based on the sensed reflected light and the calibrated TOF measurement reference information.

Figure 2A:
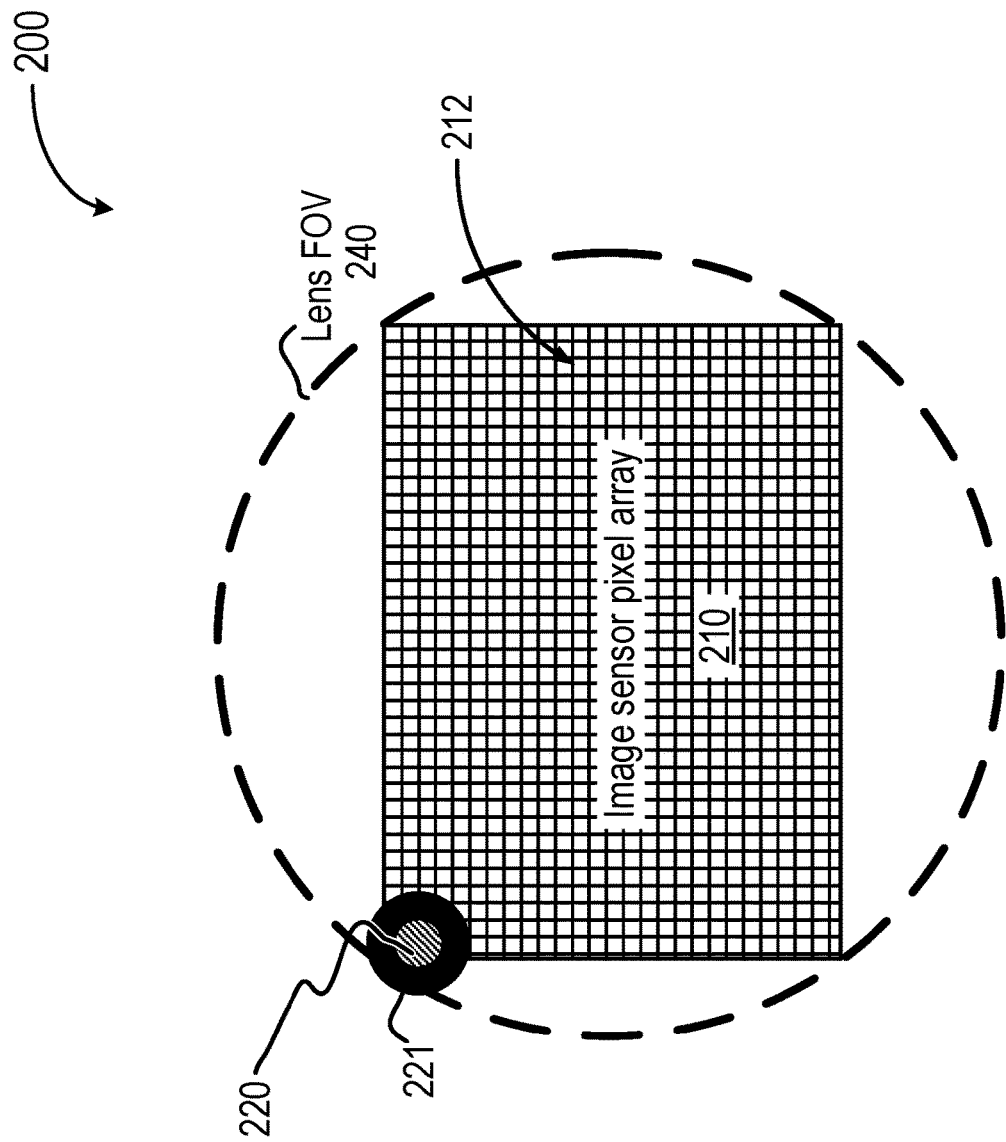
FIGS. 2A and 2B are diagrams illustrating examples of image sensor pixel array in a time-of-flight (TOF) imaging system having fiber optic feedback for calibration according to an embodiment of the present invention.

FIG. 2A is a simplified diagram illustrating a pixel array that can be used in imaging system 100 according to an embodiment of the present invention. As shown, pixel array 200 includes a plurality of pixels 212, and each pixel in the pixel array includes a photo sensitive element (e.g. a photo diode), which converts the incoming light into a current. Fast electronic switches are used as shutters to control the timing of the light sensing operation. A time-of-flight (TOF) camera acquires depth images by determining the time during which the light travels from a source to an object and to the sensor of the camera. This can be done by illuminating the object or scene with light pulses using a sequence of temporal windows and applying a convolution process to the optical signal received at the sensor. Further details are described below. As shown in FIG. 2A, pixel array 200 includes an active region 210 and a feedback region 220. The active region can be used for determining the distance of a target object, and the feedback region can be used for depth calibration. The pixel array can also include an isolation region 221 separating the feedback region 220 from the active region 210 to reduce interference. The dimension of the isolation region can be selected to prevent the light from the feedback loop to contaminate the imaging signal collected by the objective lens. In some embodiments, for example, the isolation region can have a width of about 100 µm-200 µm. In some embodiments, feedback region 220 can be located in part of the pixel array that is outside the field of view, e. g. in a corner, or in a less used region of the pixel array. Therefore, the dedicated feedback region of the sensor does not incur much overhead. The small feedback region can have a limited number of pixels, for example, from a single pixel to a 10×10 array of pixels, which allows for fast sensing and signal processing. In some embodiments, a larger feedback region can be used to provide better signal-to-noise ratio (SNR). Averaging the pixels in a small array can contribute to the accuracy. In some embodiments, both the feedback and active regions are exposed during the calibration phase, separately. The difference between the two can be used for the compensation at run time.

Figure 2B:
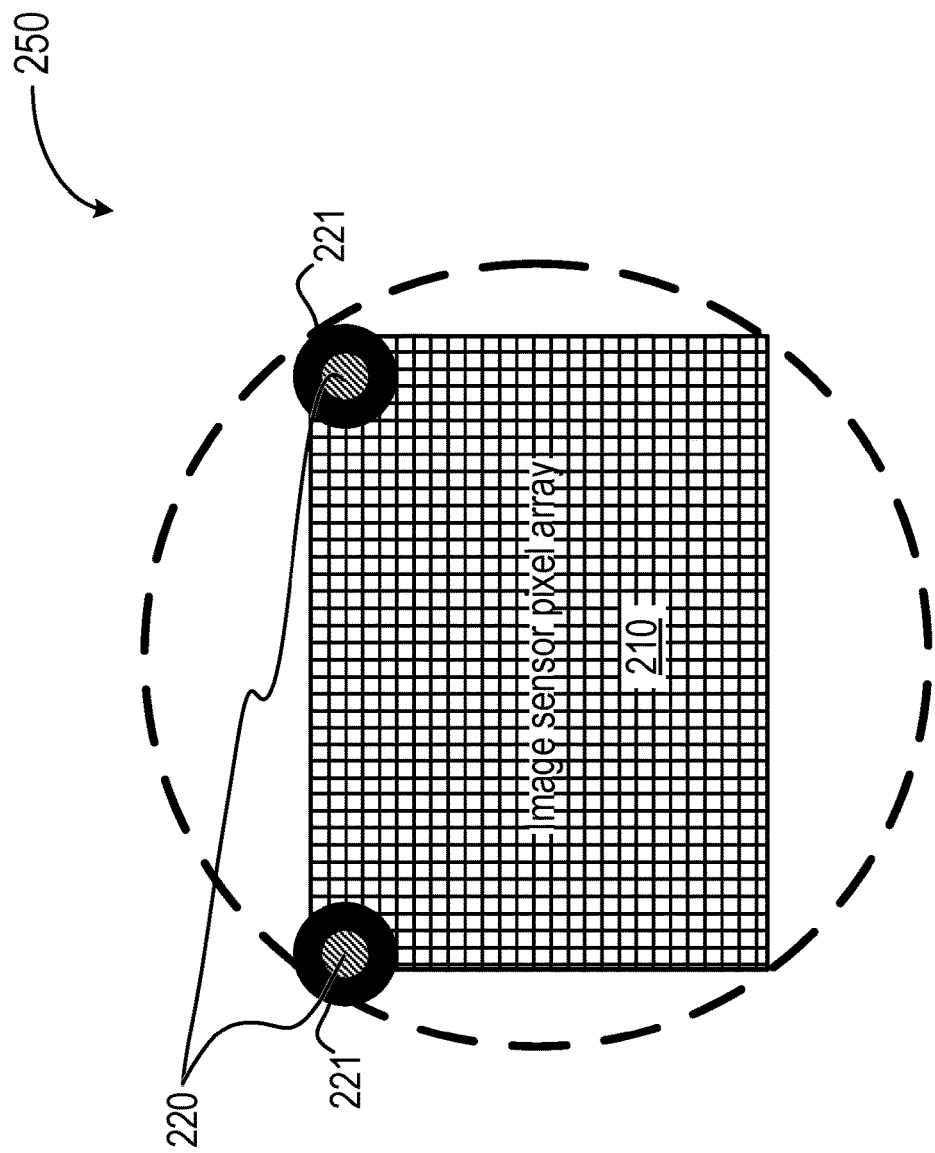

FIG. 2B is a simplified diagram illustrating a pixel array that can be used in imaging system 100 according to another embodiment of the present invention. As shown in FIG. 2B, pixel array 250 is similar to pixel array 200 of FIG. 2A, but can have more than one feedback regions. Pixel array 250 includes an active region 210 and two or more feedback regions 220. The pixel array can also include an isolation region 221 separating each feedback region from the active region. The isolation region can reduce interference between the feedback region and the active region. Pixel array 250 can be used in a TOF imaging system having two illumination sources. In some embodiments, an imaging system can include more than two illumination sources and corresponding feedback sensor regions.

Figure 3:
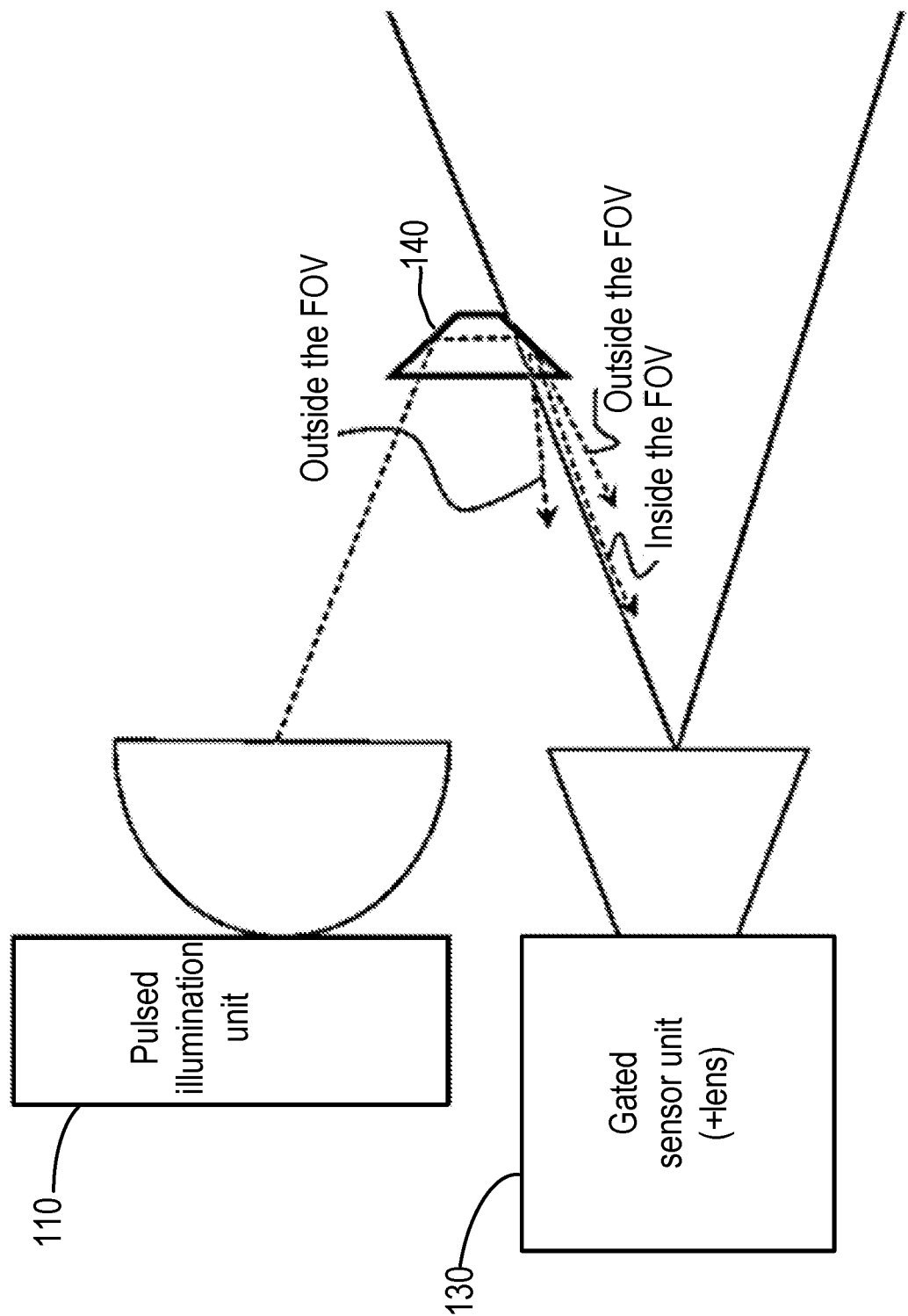
FIG. 3 is a diagram illustrating optical feedback paths in a time-of-flight (TOF) imaging system according to an embodiment of the present invention.

FIG. 3 is a simplified schematic diagram illustrating a portion of the time-of-flight (TOF) imaging system 100 of FIG. 1. FIG. 3 illustrates that the optical feedback device is configured to prevent light leakage from the optical feedback device 140 to the normal pixels in the array. Light inserted in the edge of the FOV can only hit specific pixels in the pixel array and light having different angle cannot enter the optics of the sensor.

Figure 4A:
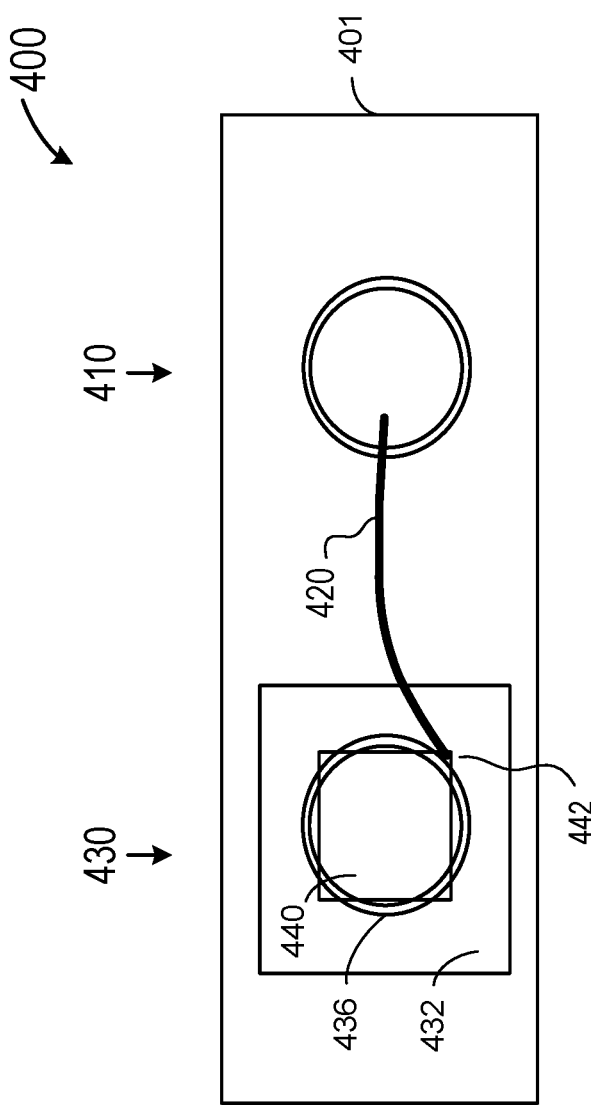
FIGS. 4A and 4B are diagrams illustrating a time-of-flight (TOF) imaging system with fiber optic feedback for calibration according to an embodiment of the present invention.
Figure 4B:
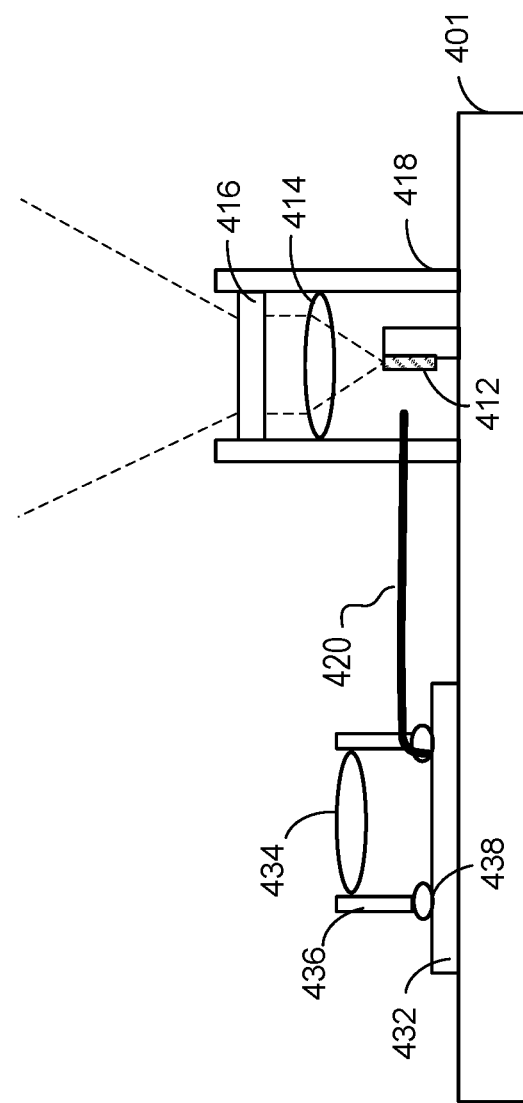

In some embodiments, the optical feedback device can be configured to fold a direct light from the illumination unit into the field of view (FOV) of the lens in the sensor unit. FIGS. 4A and 4B are simplified diagrams illustrating a time-of-flight (TOF) imaging system 400 with fiber optic feedback for calibration according to an embodiment of the present invention. FIG. 4A is a top view and FIG. 4B is a side cross-sectional view of the imaging system. Imaging system 400 includes an illumination unit 410 and a sensor unit 430 disposed on a printed circuit board (PCB) 401. As shown in FIGS. 4A and 4B, illumination unit 410 includes a diode laser source 412, a collimating lens 414, and a diffuser 416 inside an illumination housing 418. Sensor unit 430 includes an image sensor 432, a lens 434, and a lens barrel 436 that is mounted on the image sensor with an adhesive 438. Imaging system 400 also has an optical fiber 420 to provide the feedback path. In this embodiment, optical fiber 420 collects certain amount of light from the interior of the illumination housing (e. g., from parasitic reflections inside) and directs it to a corner 442 of a pixel array 440 of image sensor 432, but outside lens barrel 436. In some embodiments, opaque adhesive 438 blocks the light from entering the lens barrel. In this example, corner region 442 of the pixel array serves as the feedback region of the image sensor.

Figure 5:
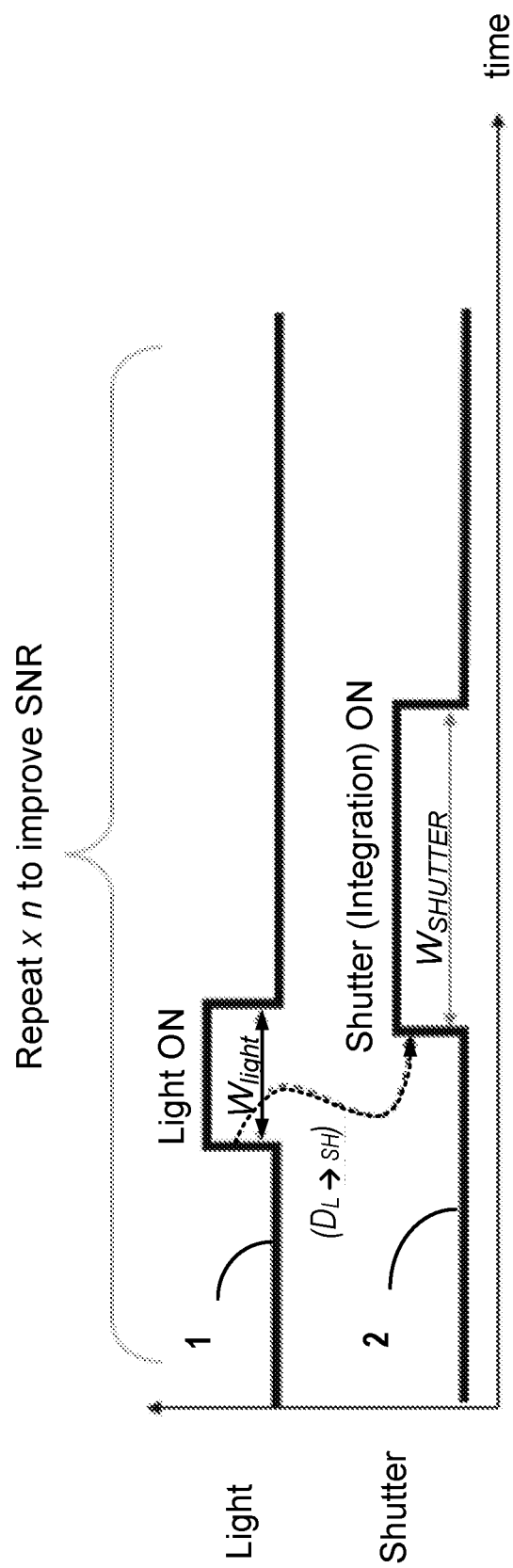
FIG. 5 is a timing diagram illustrating a method for time-of-flight (TOF) depth measurement according to an embodiment of the present invention.

FIG. 5 is a timing diagram illustrating a method for time-of-flight (TOF) depth measurement according to an embodiment of the present invention. In FIG. 5, the horizontal axis is the time, and the vertical axis is the intensity or magnitude of the light signal. Waveform 1 represents the light pulse arriving at the sensor, which can be reflected from the target or provided by the feedback optical device. Waveform 2 represents the shutter window. It can be seen that the light pulse has a width $W_{light}$, and the shutter window has a width of $W_{shutter}$. Further, there is a time delay between the leading edge of the light and the shutter, $D_{L \to SH}$. It can be seen that the amount of light sensed by the sensor varies with the relative delay of the shutter with respect to the light.

Figure 6:
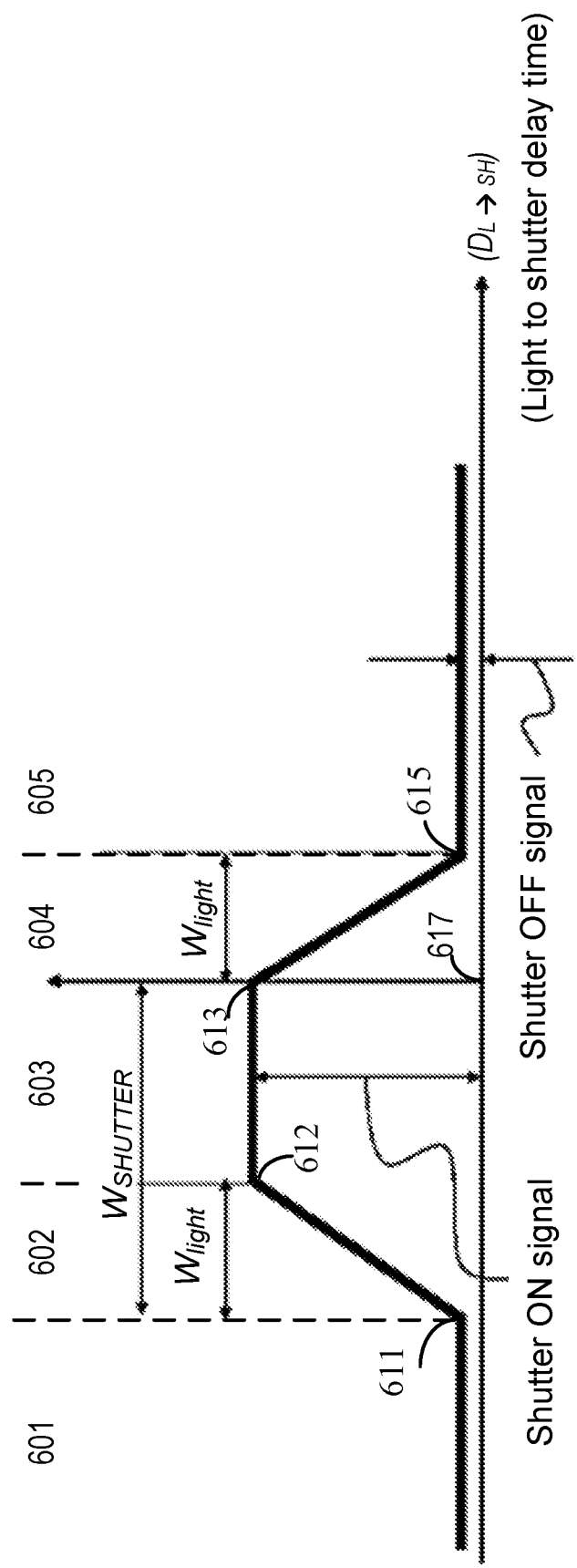
FIG. 6 is a diagram illustrating sensed signal versus light to shutter delay time according to an embodiment of the present invention.

FIG. 6 is a diagram illustrating the magnitude of sensed light signal versus light-to-shutter delay time according to some embodiments of the present invention. In FIG. 6, the horizontal axis is the light-to-shutter delay, $D_{L \to SH}$, and the vertical axis is the amount of light sensed by the sensor. The diagram is divided into several regions, 601 to 605. In region 601, the shutter window is far ahead of the light pulse (to the left) and the shutter is already closed before the light arrives. In other words, the light-to-shutter delay is negative. Thus, there is no overlap between the shutter and the light. The delay increases moving to the right of the horizontal axis. At point 611, the shutter starts to overlap with the light. As the delay increases further through region 602, the overlap between the shutter and the light continues to increase, and more light is sensed, resulting in the rising curve in region 602. At point 612, the full width of the light starts to overlap with the shutter window. In region 603, the shutter is fully open throughout the duration of the light pulse, and the width of region 603 is determined by the width of the shutter opening $W_{shutter}$ minus the width of the light pulse $W_{light}$. The magnitude of light received in this region is marked "Shutter ON signal." At point 613, the rising edge of the shutter window is aligned with the rising edge of the light pulse, and the delay $D_{L \to SH}$ is zero, as marked by point 617. In region 604, the delay $D_{L \to SH}$ continues to increase, and the overlap between the shutter window and the light decreases. As a result, the magnitude of the sensed light decreases in this region, as shown by the declining curve. At point 615, the delay is equal to the light width, and the shutter opens as the light pulse ends; as a result, no light is sensed. In region 605, the shutter opens after the light pulse has already passed. No light is sensed in region 605, and the amount of sensed light in this region is marked "Shutter OFF signal." Note that in regions 602 and 604, the amount of light collected by the sensor varies depending on the light-to-shutter delay, $D_{L \to SH}$. These regions are used in TOF depth measurement calibration, as explained below.

Figure 7A:
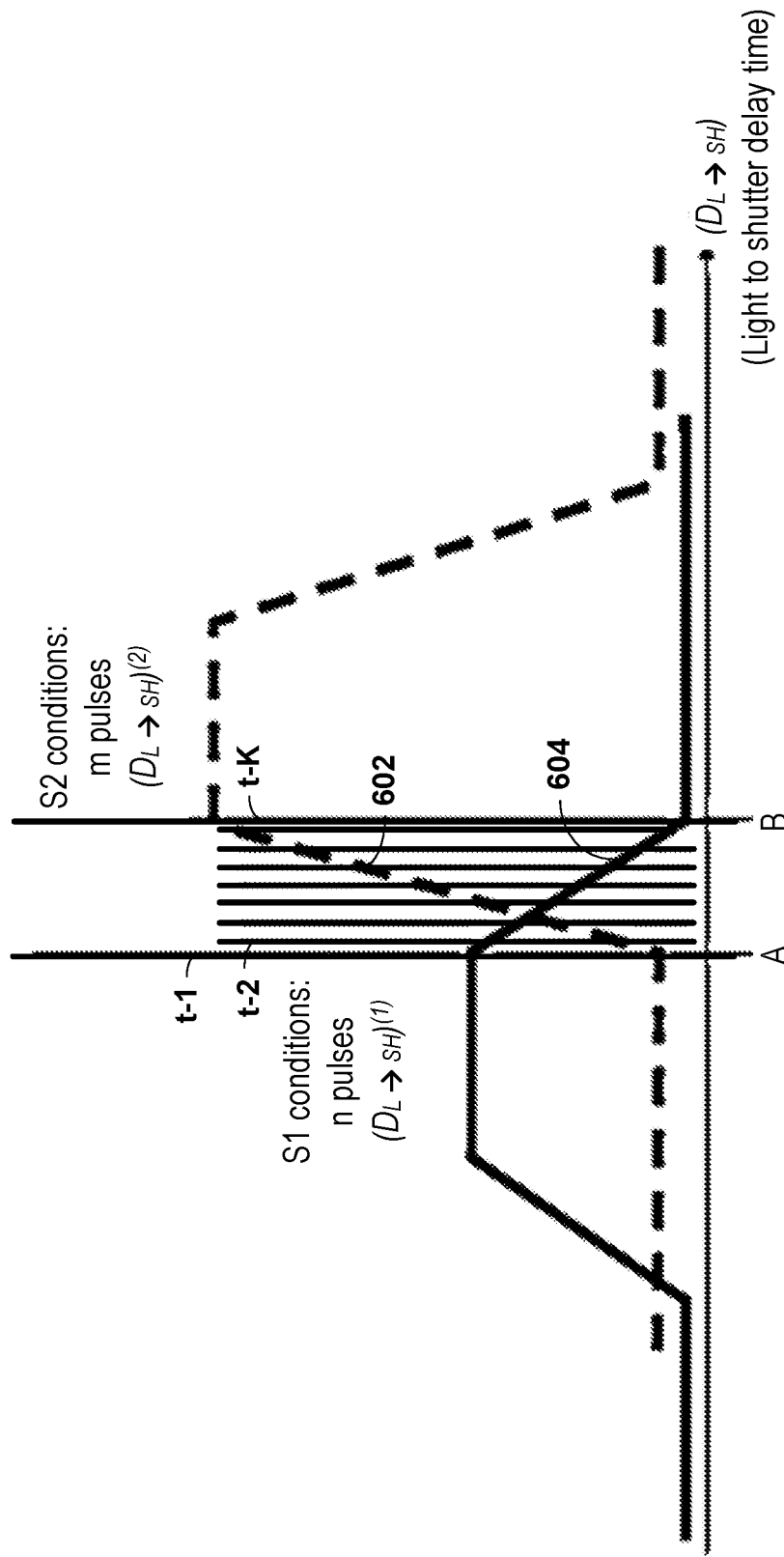
FIG. 7A is a diagram illustrating sensed signals versus light to shutter delay times of two signals with two shutters according to an embodiment of the present invention.

FIG. 7A is a diagram illustrating sensed light signals versus light-to-shutter delay times of two signals with two shutters according to an embodiment of the present invention. The time-of-flight (TOF) camera acquires depth images by determining the time which light needs from a source to an object and reflected back to the camera. This is can be done by illuminating the object or scene with a light pulse and applying a convolution of a sequence of windows with varying delay times to the received optical signal by the sensor. In some embodiments, multiple groups of calibration light pulses are transmitted using a sequence of shutter windows that includes delay times representing a range of depth. Each group of light pulses is followed by a readout operation. In each readout, the light from the optical feedback device are sensed in the feedback region of the pixel array of the sensor. The readout data is then analyzed using a convolution process to determine TOF depth data. As described above, in regions 602 and 604 of FIG. 6, the amount of light collected at the sensor varies depending on the light-to-shutter delay, $D_{L \to SH}$. Sensed light data similar to that in FIG. 6 can be collected. These regions are used in TOF depth measurement calibration. As shown in FIG. 7A, two calibration sequences can be carried out to reduce the effect of unknown reflectivity of the target object; and the two sequences are denoted S1 and S2. In an embodiment, the difference in light-to-shutter delay, $D_{L \to SH}$ for the two sequences is equal to the width of the shutter window $W_{shutter}$. Under this condition, region 604 of sequence S1 and region 602 of sequence S2 can be aligned in the plot of FIG. 7A and form slices t-1, t-2, ..., t-k. In each slice, the amount of light collected in S1 and S2, respectively, represent two portions of the reflected light pulse, and the ratio of S2/S1 is related to a corresponding depth or distance to the target object. The region between points A and B in FIG. 7A represents the depth range that can be determined by this TOF imager. Data of received light can be collected by measuring at multiple points with delays between A and B in front of a target. Using a convolution process, a look up table (LUT) can be constructed that relates the ratio S2/S1 to the depth or distance to the target. The initial lookup table can be constructed in the factory calibration process. In a subsequent TOF depth measurement, two measurements are made with delays from the same slice of time in FIG. 7A. A ratio of sensed light S2/S1 is determined based on sensed data, and the corresponding depth can be determined from the look up table.

Figure 7B:
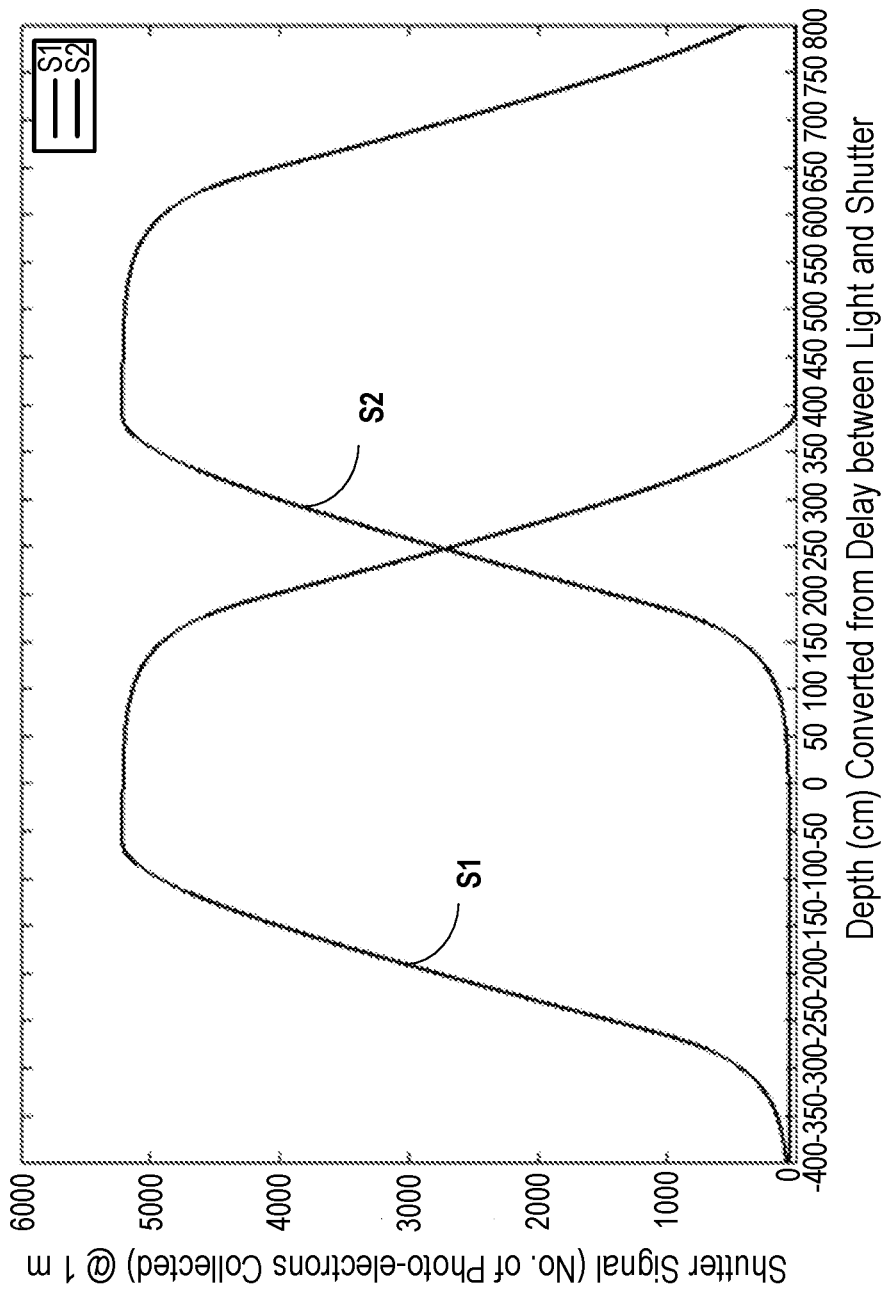
FIG. 7B is a diagram illustrating simulated signals versus light to shutter delay times of two signals with two shutters according to an embodiment of the present invention.

FIG. 7B is a diagram illustrating simulated signals versus light-to-shutter delay times of two signals with two shutters according to an embodiment of the present invention. The simulation was carried out with two shutters on a static test with a flat target at 100 cm from the camera, scanning a range of the light-to-shutter delays. Similar to FIG. 7A, the shutter signal (or the number of photo-electrons collected at the sensor) is plotted for two shutters S1 and S2. In this view, depth can be negative. In the horizontal axis of FIG. 7B, the delay is converted into depth by the following equation:

$$<\text{depth}> = <\text{speed of light}>/2 * (<\text{electronic delay}> - <\text{simulation delay vector}>)$$

In some embodiments, the width of the light pulse is 5-10 nsec, and the shutter window width is 5-15 nsec. The range of delays examined is between 5-20 nsec. In some embodiments, the light pulse width can be between 3 nsec to 20 sec. The width of the shutter can be in the same range.

Figure 7C:
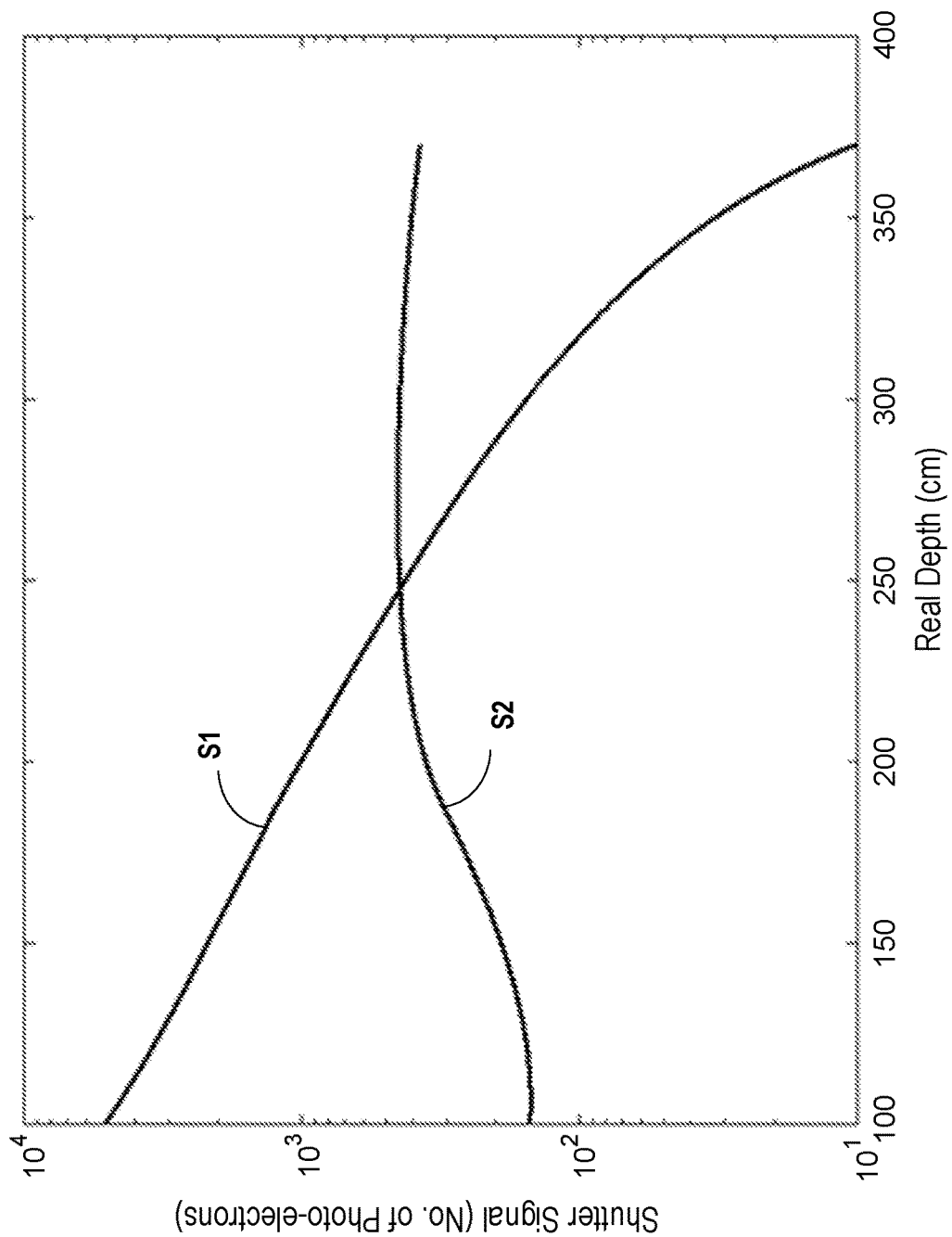
FIG. 7C is a diagram illustrating simulated signals versus depth for two signals with two shutters according to an embodiment of the present invention.

FIG. 7C is a diagram illustrating simulated signals versus depth for two signals with two shutters according to an embodiment of the present invention. FIG. 7C shows data as measured on a rail against a wall at different distances (with 1/distance$^2$ decay). It can be seen that there is a correlation between the ratio of S2/S1 and the depth.

From testing data such as those obtained using methods described in FIGS. 5, 6, and 7A-7C, a look up table (LUT) is constructed in the factory calibration process. In a TOF depth measurement, a ratio of S2/S1 is determined based on sensed data, and the corresponding depth can be determined from the lookup table.

As described above, time-of-flight depth measurement systems can be susceptible to variations in process and operating conditions, such as temperature, voltage, and frame rate, etc. In order to mitigate the effects of variations, embodiments of the invention provide a system and method for run-time calibration of TOF depth measurement using an optical feedback device as described above. The small number of feedback pixels allows for fast sensing and signal processing, and with the strong feedback illumination, for example provided by optical fiber, the number of sampling pulses can be greatly reduced. The process of illumination and readout can be carried out in a short time. As a result, the depth calibration can be carried out at run-time without affecting the frame rate of the camera. The calibration can be carried out in each frame. Further, the overhead in power consumption or dedicated feedback pixels is small. Isolation between the feedback region and active region of the pixel array is provided to minimize interference.

Figure 8:
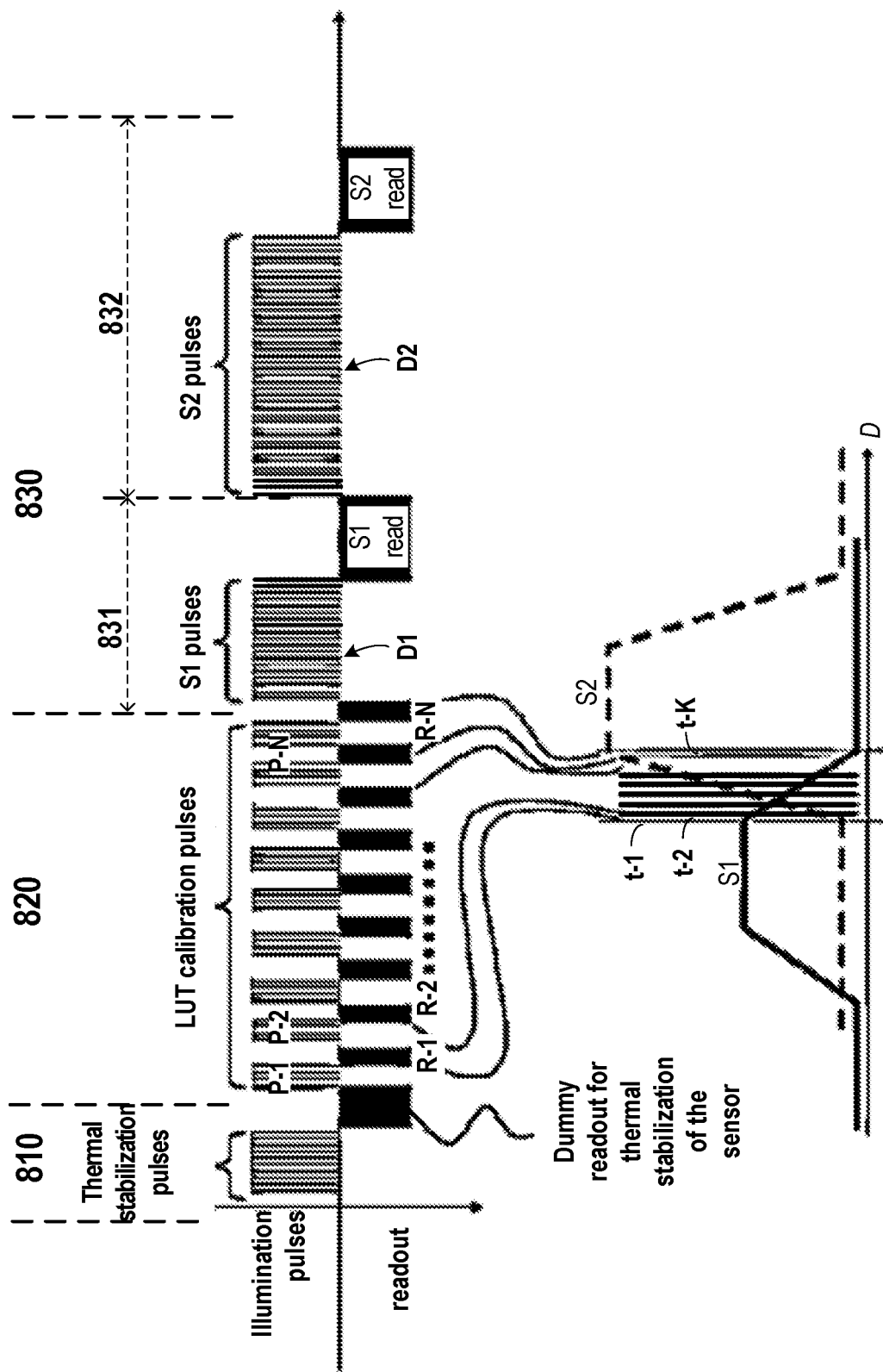
FIG. 8 is a timing diagram illustrating a method for calibration and depth measurement in a time-of-flight (TOF) imaging system according to an embodiment of the present invention.

FIG. 8 is a timing diagram illustrating a method for depth profile calibration between frames of time-of-flight depth measurement according to an embodiment of the present invention. The method includes a stabilization period 810, a calibration period 820, and a measurement period 830. In stabilization period 810, thermal stabilization illumination pulses are emitted, followed by a dummy readout for thermal stabilization of the sensor. In calibration period 820, the time-of-flight lookup table (LUT) is calibrated. Here, multiple groups of calibration illumination pulses P-1, P-2, . . . , P-N are emitted using a sequence of shutter windows that includes delay times representing a range of depth. Each group of light pulses is followed by a readout operation, R-1, R-2, . . . , R-N, respectively. In each readout, the light from the optical feedback device are sensed in the feedback region of the pixel array of the sensor. The readout data is then analyzed using a convolution process to determine TOF depth data as describe above in connections with FIGS. 5, 6, and 7A-7C. The depth data is then used to calibrate the lookup table.

The measurement period 830 has two steps 831 and 832. In the first step 831, a first group of light pulses S1 with a first shutter delay D1 is transmitted to illuminate the target. Because only a small amount of light can be collected by the sensor within a shutter window, often a large number, e.g., several thousand, pulses are sent out and gathered to increase the signal to noise ratio. During the "S1 read" period, the light reflected from the target is sensed in the active region of the pixels in the sensor. In the second step 832, a second group of light pulses S2 with a second shutter delay D2 is transmitted to illuminate the target. During S2 read, the light reflected from the target is sensed in the active region of the pixels in the sensor. Next, the ratio of sensed data readouts S2/S1 are used to determine the distance of the target object using the calibrated look up table. In some embodiments, S1 and S2 have preset delays that are chosen in the factory calibration process or in the field of application.

Figure 9:
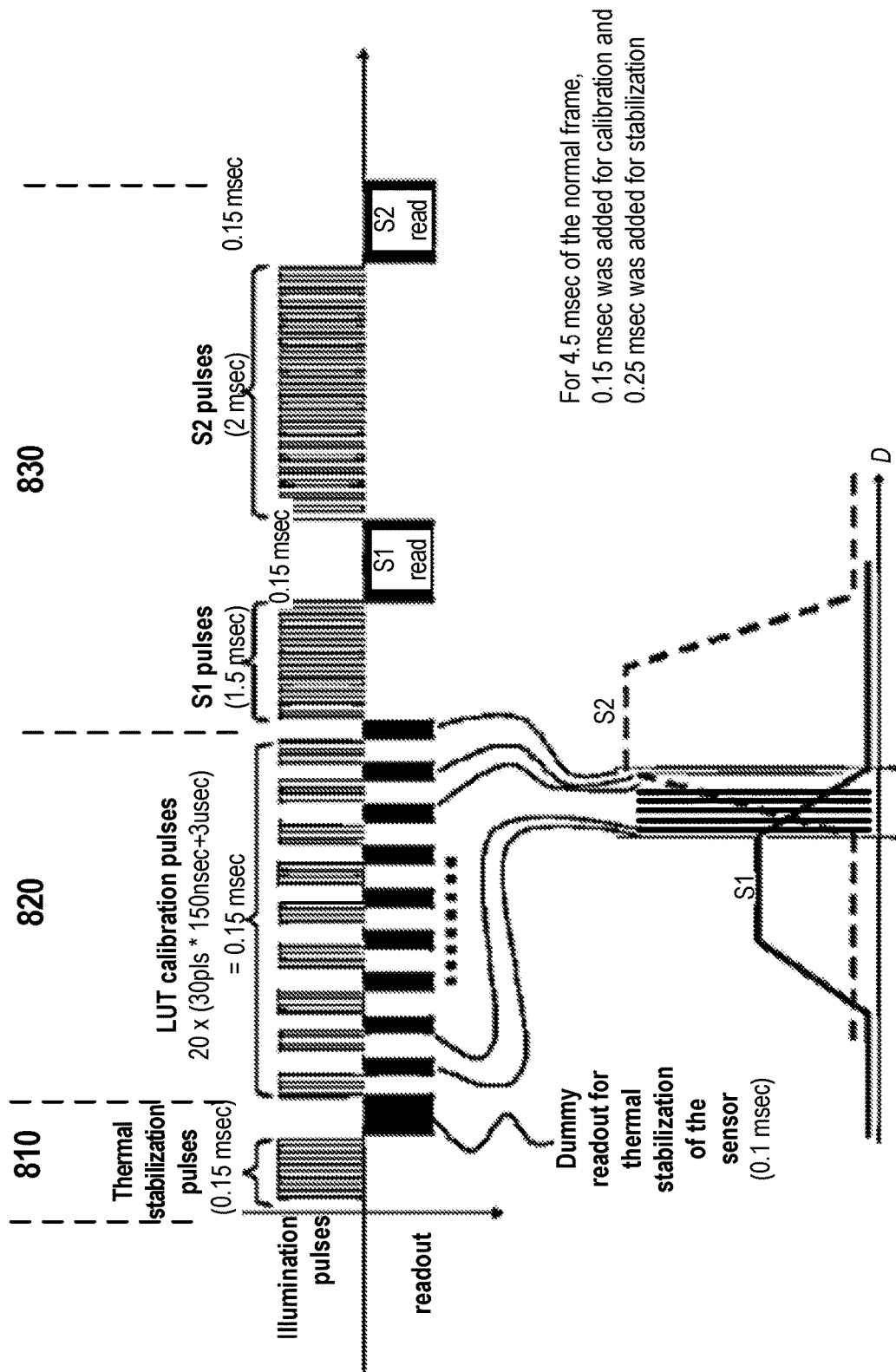
FIG. 9 is another timing diagram illustrating a method for calibration and depth measurement in a time-of-flight (TOF) imaging system according to an embodiment of the present invention.

FIG. 9 is a timing diagram illustrating that the depth profile calibration can fit in between frames of time-of-flight depth measurement according to an embodiment of the present invention. FIG. 9 is similar to FIG. 8, and further includes examples of the length of time each operation takes within a frame of time-of-flight depth measurement. In this embodiment, the thermal stabilization pulses take 0.15 msec, and the dummy readout for thermal stabilization takes 0.1 msec. Therefore, the length of the stabilization period is about 0.25 msec. In the look up table (LUT) calibration period 820, 20 steps of calibration light pulses and readouts are used, each with a different light-to-shutter delay time. In an example, each step includes 30 pulses, each having a pulse width of 150 nsec, followed by a read out operation of 3 μsec. Thus, the calibration period takes about 0.15 msec. In the measurement period 830, the S1 step can include 1.5 msec of light pulses (e.g., 1,000 pulses of 150 nsec pulses) followed by a 0.5 msec readout. Similarly, the S2 step can include 2.0 msec of light pulses, followed by a 0.5 msec readout. In this example, the complete operation including stabilization, full range depth calibration, and TOF depth measurement takes 4.9 msec. The calibration phase takes about 1/300 of the total operation. This optical operation is fast enough to fit in a frame rate of 60 or more frames per second (fps).

The embodiments of the invention provide many advantages over conventional methods. For example, the feedback optical device can provide strong light for calibration. For example, the feedback optical device can include optical fiber. One or more separate feedback regions in the pixel array are used for sensing the feedback optical signal. The feedback regions are configured in unused or less used regions of the pixel array, and is much smaller than the active region of the array. For example, several pixels are sufficient for feedback sensing if the feedback optical device can provide a strong signal. The small feedback sensing region enables quick sensing and fast processing of sensed data, allowing fast calibration of the depth range of interest.

Figure 10:
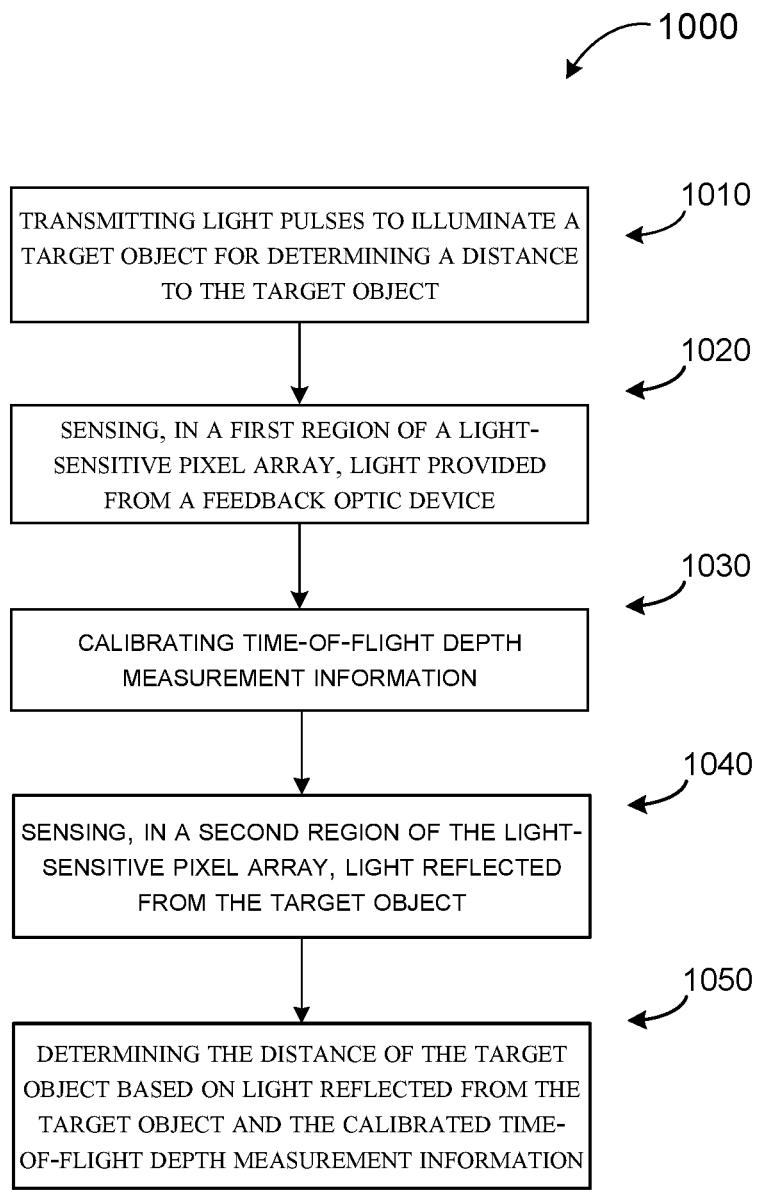
FIG. 10 is a flowchart illustrating a method for calibration and depth measurement in a time-of-flight (TOF) imaging system according to an embodiment of the present invention.

FIG. 10 is a simplified flowchart illustrating a method for TOF depth measurement including full range depth calibration according to an embodiment of the present invention. The method described above can be summarized in the flowchart of FIG. 10. As shown, method 1000 includes transmitting light pulses to illuminate a target object, at step 1010. Next, at step 1020, light provided from an optical feedback device is sensed in a first region of a light-sensitive pixel array. Here, the first region is used as the feedback region. The optical feedback device receives a portion of the transmitted light pulses. The feedback optical device includes a preset reference depth for TOF depth measure. The light from the optical feedback device is sampled using a sequence of shutter windows that includes delay times representing a range of distances. For TOF depth measurement, the method includes sensing, in a second region of the light-sensitive pixel array, the scene data which is light reflected from the target object from the transmitted light pulses, at step 1030. The second region is the active region of the pixel array. The method includes calibrating time-of-flight (TOF) depth measurement reference information based on the sensed light in the first region of the pixel array, at step 1040. This process is described in details above in connection with FIGS. 5, 6 and 7A-7C. Note that, depending on the embodiments, steps 1030 and 1040 can be carried out in any order. For example, after the calibration data (1020) and the scene data (1040) are captured, data calibration can be processed first and then the scene data is processed. Alternative, both TOF data calibration and scene data processing can be carried out simultaneously. Next, the method includes, at step 1050, determining a distance of the target object based on the sensed reflected light and the calibrated TOF measurement reference information.

In some embodiments, the method can be carried out in a digital camera characterized by a preset frame rate. The calibration can fit in a single frame period of the camera. In an embodiment, the light from the optical feedback device is sampled using a sequence of shutter windows that includes delay times representing a range of distance. A convolution process is then used to correlate the measured signals with the distance.

Embodiments of the invention provide integrated mechanics, electronics, and optics design and processing procedures to form a miniature circuit for optical feedback for high speed time-of-flight (TOF) signal from the illumination portion into the corner pixels within the image sensor. The design includes high level of integration, efficient transfer of light in the feedback loop to save energy consumption, and robustness over production tolerances. The embodiments can also avoid occlusion in the imaging optics, not add constraints on the back focal length of the objective lens, and avoid leakage of light from the feedback loop into the imaging area, and vice versa. Further details are described below.

Figure 11:
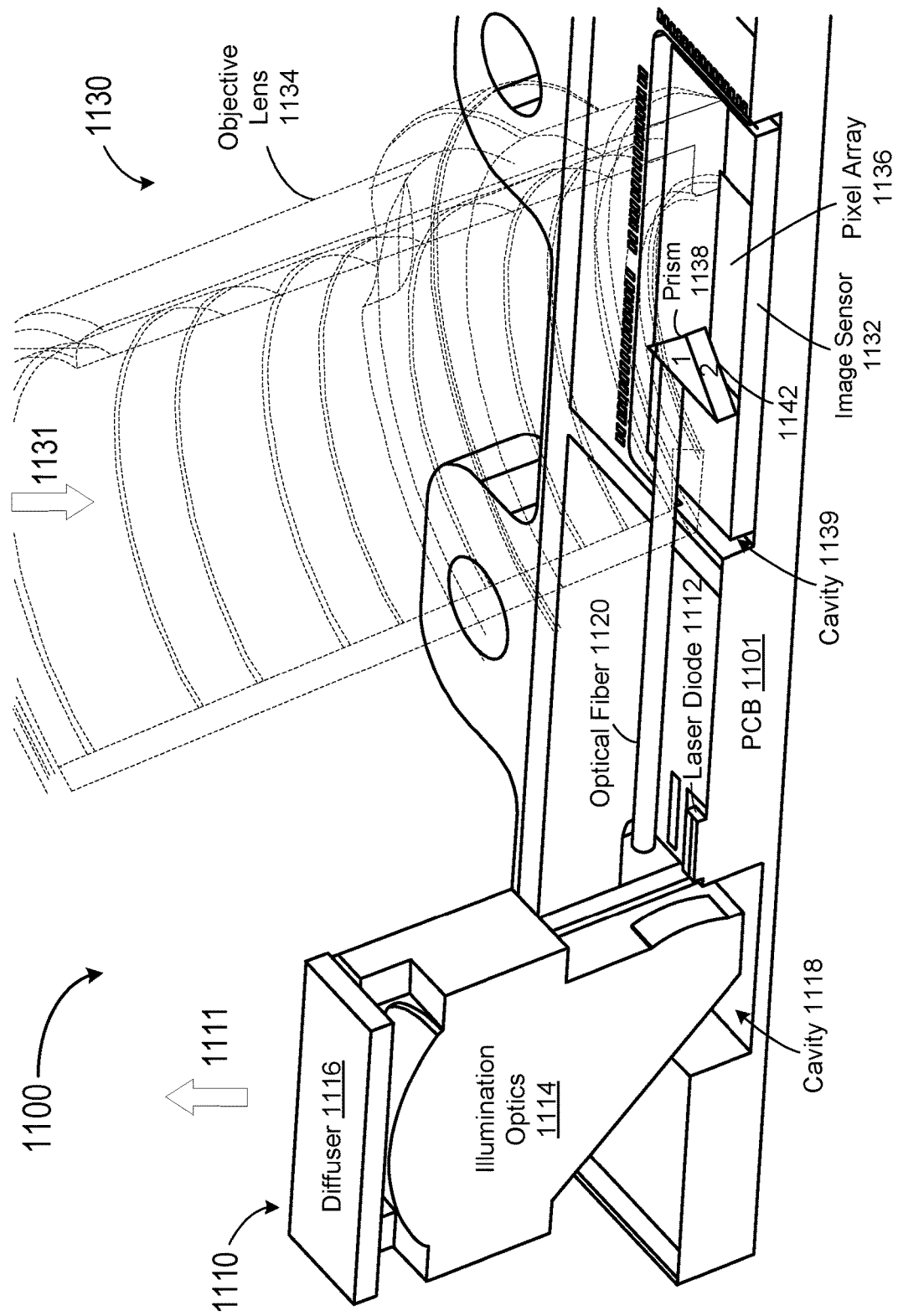
FIG. 11 is a perspective view diagram illustrating a portion of a time-of-flight (TOF) imaging system with fiber optic feedback for calibration according to an embodiment of the present invention.

FIG. 11 is a perspective view diagram illustrating a portion of time-of-flight (TOF) imaging system 1100 with fiber optic feedback for calibration according to an embodiment of the present invention. Imaging system 1100 includes an illumination unit 1110 and a sensor unit 1130 disposed on a printed circuit board (PCB) 1101. As shown in FIG. 11, illumination unit 1110 includes a laser diode source 1112, an illumination optics 1114, and a diffuser 1116. The illumination optics 1114 is disposed in a cavity 1118 in the PCB 1101, and can include prisms with integrated lenses to fold and collimate the light beam from the laser diode. Sensor unit 1130 includes an image sensor 1132 with a pixel array 1136, and an objective lens 1134 (shown in broken lines) mounted on the image sensor 1132. As shown in FIG. 11, for TOF imaging, emitted light 1111 from diffuser 1116 is directed to a target object disposed above and outside the drawings in FIG. 11, and light 1131 reflected from the target object enters through objective lens 1134 to reach the pixel array in image sensor 1132. Imaging system 1100 also has an optical fiber 1120 to provide the feedback path. In this embodiment, an optical fiber 1120 collects a small amount of light from the interior of the illumination optics housing (e. g., from parasitic reflections inside) and directs it to a prism 1138 that is attached to a corner 1142 of the pixel array of image sensor 1132. In this example, corner region 1142 of the pixel array serves as the feedback region of the image sensor.

Figure 12:
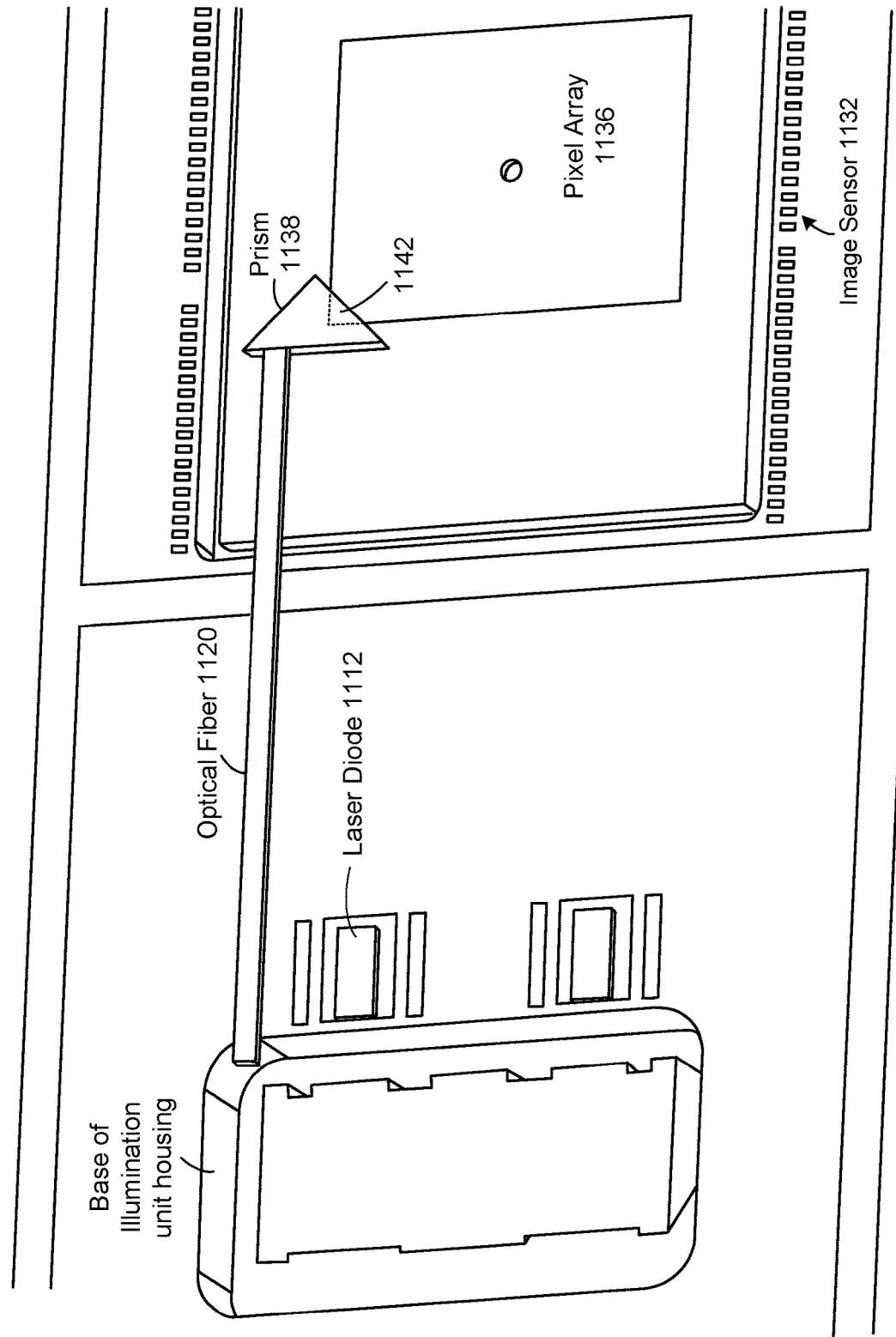
FIG. 12 is a cross-sectional plan view of a portion of time-of-flight (TOF) imaging system of FIG. 11 according to an embodiment of the present invention.

FIG. 12 is a cross-sectional plan view of a portion of time-of-flight (TOF) imaging system 1100 of FIG. 11 according to an embodiment of the present invention. A laser diode 1112 is coupled to the base of the housing of the illumination unit. An optical fiber 1120 collects a small amount of light from the interior of the illumination optics housing (e. g., from parasitic reflections inside) and directs it to a prism 1138 that is attached to a corner 1142 of the pixel array of image sensor 1132. In some embodiments, no specific optical element in the illumination unit housing is needed to direct a portion of the laser light to the optical fiber 1120. Optical fiber 1120 directs the light to prism 1138 attached to a sample area 1142 of the pixel array. In this embodiment, scattered light from the illumination housing is collected by the optical fiber 1120, and scattered light from the prism 1138 can be sensed in the feedback sense area 1142 of the pixel array.

In FIGS. 11 and 12, optical fiber 1120 is coupled to the hypotenuse of the prism 1138. However, the coupling can also be made to a short side (cathetus) of the prism, as shown in FIGS. 13 and 14.

Figure 13:
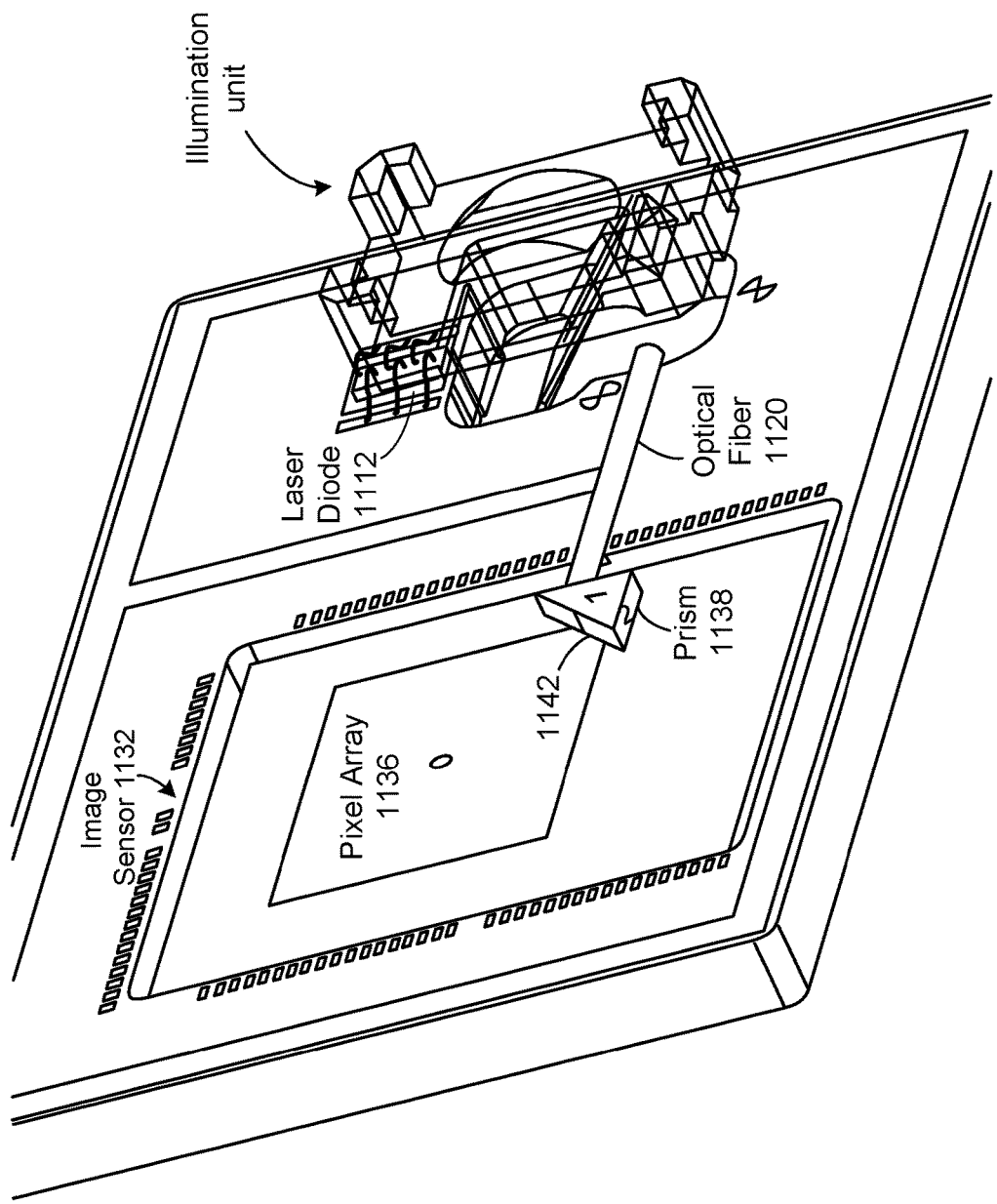
FIG. 13 is a perspective view of a portion of time-of-flight (TOF) imaging system 1100 of FIG. 11 according to an embodiment of the present invention.

FIG. 13 is a perspective view of a portion of time-of-flight (TOF) imaging system 1100 of FIG. 11 according to an embodiment of the present invention. A laser diode 1112 is coupled to the base of the housing of the illumination unit. An optical fiber 1120 collects a small amount of light from the interior of the illumination optics housing (e. g., from parasitic reflections inside) and directs it to a prism 1138 that is attached to a corner 1142 of the pixel array 1136 of image sensor 1132. In this embodiment, scattered light from the illumination housing is collected by the optical fiber 1120. Optical fiber 1120 directs the scattered light to prism 1138, which is attached to a sample area 1142 of the pixel array 1136. Light from the prism 1138 can be sensed in the feedback sense area 1142 of the pixel array 1136 for calibration.

Figure 14:
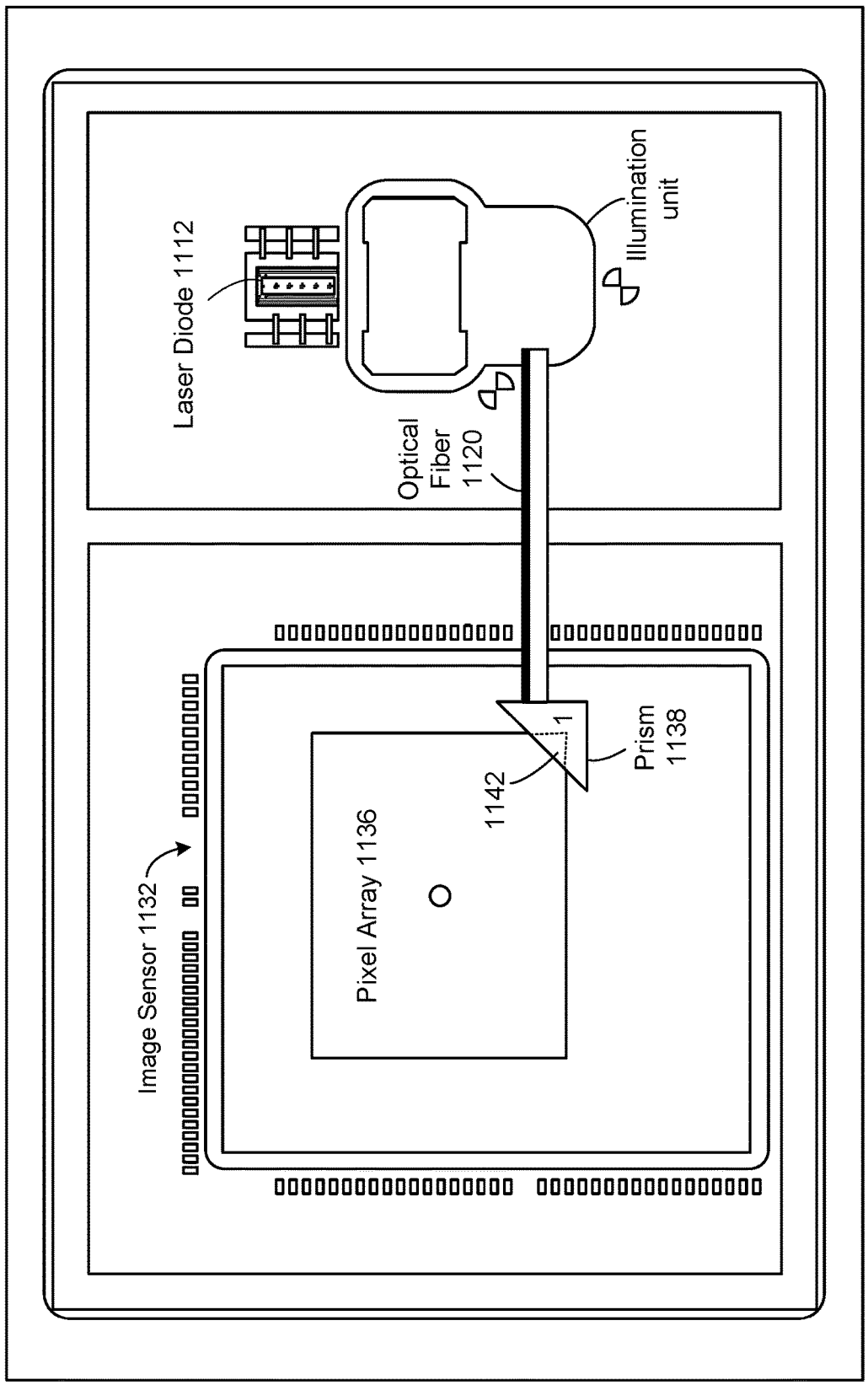
FIG. 14 is a cross-sectional plan view of a portion of time-of-flight (TOF) imaging system of FIG. 11 according to an embodiment of the present invention.

FIG. 14 is a cross-sectional plan view of a portion of time-of-flight (TOF) imaging system 1100 of FIG. 11 according to an embodiment of the present invention. A laser diode 1112 is coupled to the base of the housing of the illumination unit. An optical fiber 1120 collects a small amount of scattered light from the interior of the illumination optics housing (e. g., from parasitic reflections inside) and directs it to a prism 1138 that is attached to a corner 1142 of the pixel array of image sensor 1132. Optical fiber 1120 directs the light to prism 1138 attached to a sample area 1142 of the pixel array. Light from the prism 1138 can be sensed in the feedback sense area 1142 of the pixel array 1136.

Figure 15:
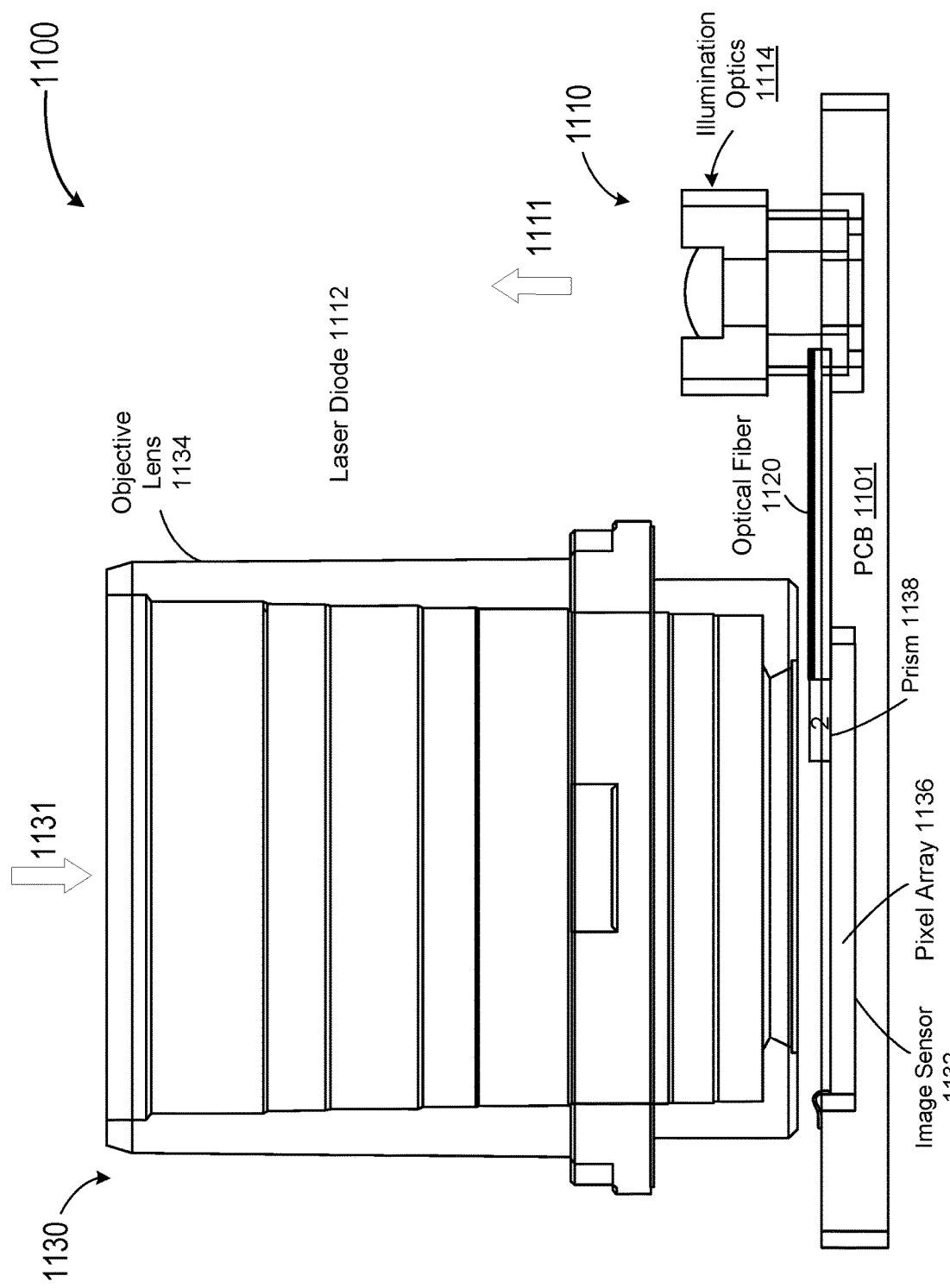
FIG. 15 is a cross-sectional side view of a portion of time-of-flight (TOF) imaging system of FIG. 11 according to an embodiment of the present invention.

FIG. 15 is a cross-sectional side view of a portion of time-of-flight (TOF) imaging system 1100 of FIG. 11 according to an embodiment of the present invention. Imaging system 1100 in FIG. 15 includes an illumination unit 1110 and a sensor unit 1130 disposed on a printed circuit board (PCB) 1101. As shown in FIG. 15, illumination unit 1110 includes a laser diode source (not shown), an illumination optics 1114. Sensor unit 1130 includes an image sensor 1132 with a pixel array 1136, and an objective lens 1134 mounted on the image sensor 1132. As shown in FIG. 15, for TOF imaging, emitted light 1111 from illumination unit 1110 is directed to a target object disposed above and outside the drawings in FIG. 15, and light 1131 reflected from the target object enters through objective lens 1134 to reach the pixel array 1136 in image sensor 1132. Imaging system 1100 also has an optical fiber 1120 to provide the feedback path. In this embodiment, optical fiber 1120 collects a small amount of scattered light from the interior of the illumination optics housing and directs it to a prism 1138 that is attached to a corner 1142 of the pixel array 1136 of image sensor 1132. In this example, corner region 1142 of the pixel array serves as the feedback region of the image sensor.

Figure 16:
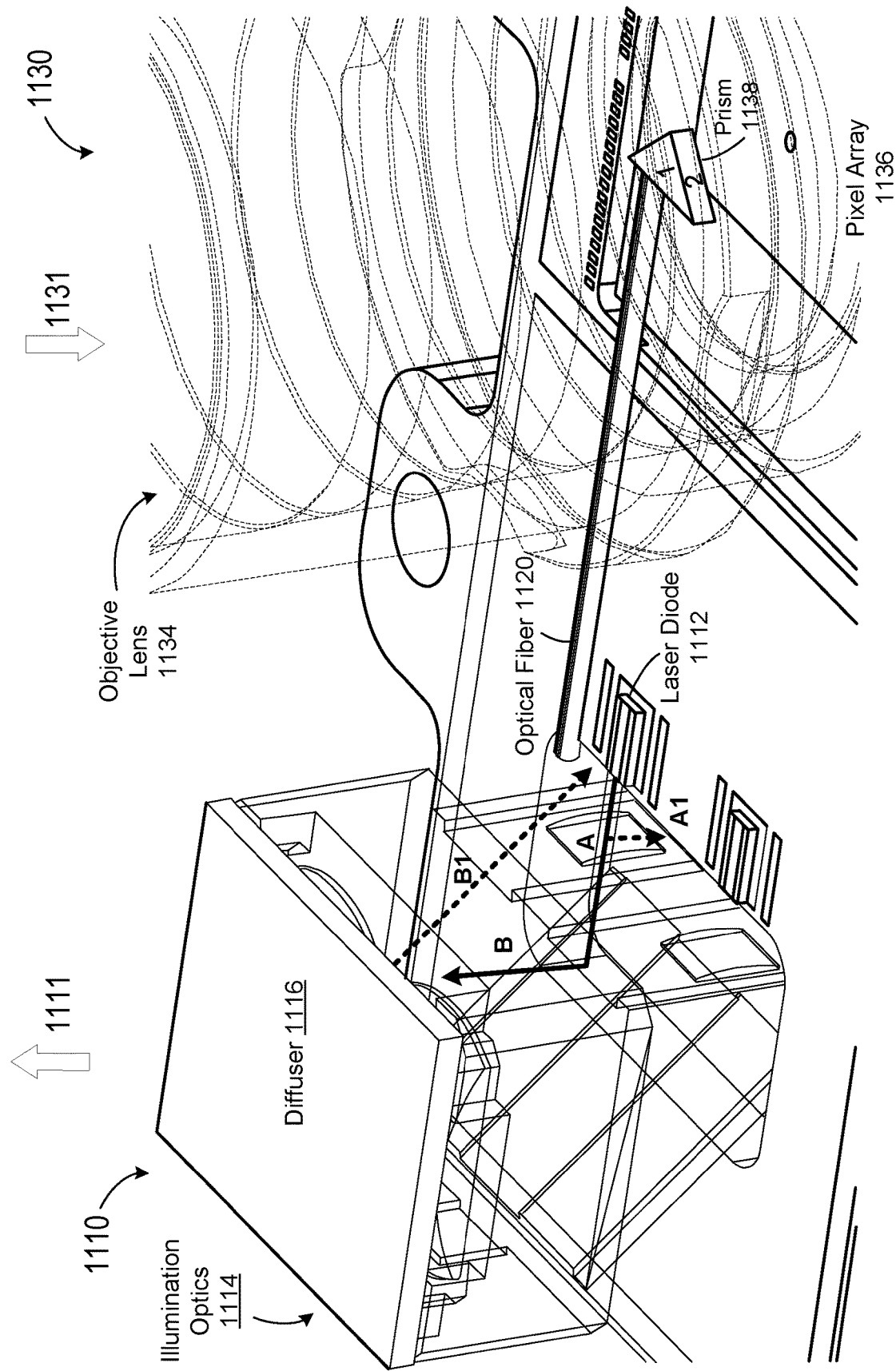
FIG. 16 is another perspective view diagram illustrating a portion of a time-of-flight (TOF) imaging system with fiber optic feedback for calibration according to an embodiment of the present invention.

FIG. 16 is another perspective view diagram illustrating a portion of time-of-flight (TOF) imaging system 1100 with fiber optic feedback for calibration according to an embodiment of the present invention. As shown in FIG. 16, illumination unit 1110 includes a laser diode source 1112, an illumination optics 1114, and a diffuser 1116. The illumination optics 1114 is disposed in a cavity 1118 in the PCB 1101, and can include prisms with integrated lenses to fold and collimate the light beam from the laser diode. Sensor unit 1130 includes an image sensor with a pixel array 1136, and an objective lens 1134 (shown in broken lines) mounted on the image sensor 1132. As shown in FIG. 16, for TOF imaging, emitted light 1111 from diffuser 1116 is directed to a target object disposed above and outside the drawings in FIG. 11, and light 1131 reflected from the target object enters through objective lens 1134 to reach the pixel array 1136 in the image sensor. The Imaging system also has an optical fiber 1120 to provide a feedback path. In this embodiment, optical fiber 1120 collects a small amount of light from the interior of the illumination optics housing (e. g., from parasitic reflections inside) and directs it to a prism 1138 that is attached to a corner 1142 of the pixel array of image sensor 1132. In this example, corner region 1142 of the pixel array serves as the feedback region of the image sensor.

In FIG. 16, light beam A goes from the laser into a folding surface of the prism in the illumination optics 1114. Light beam A1 reflected back from the prism entrance as stray light into a cavity in the illumination unit. Light beam B exits collimated from the prism and is directed to the diffuser 1115. Light beam B1 is reflected back from the diffuser as stray light into the cavity. The stray light from the cavity is collected by the optical fiber 1120. In embodiment of the invention, the amount of stray light was measured by using a fiber connect to optical power meter to verify that enough light signal can be collected for feedback calibration.

Figure 17:
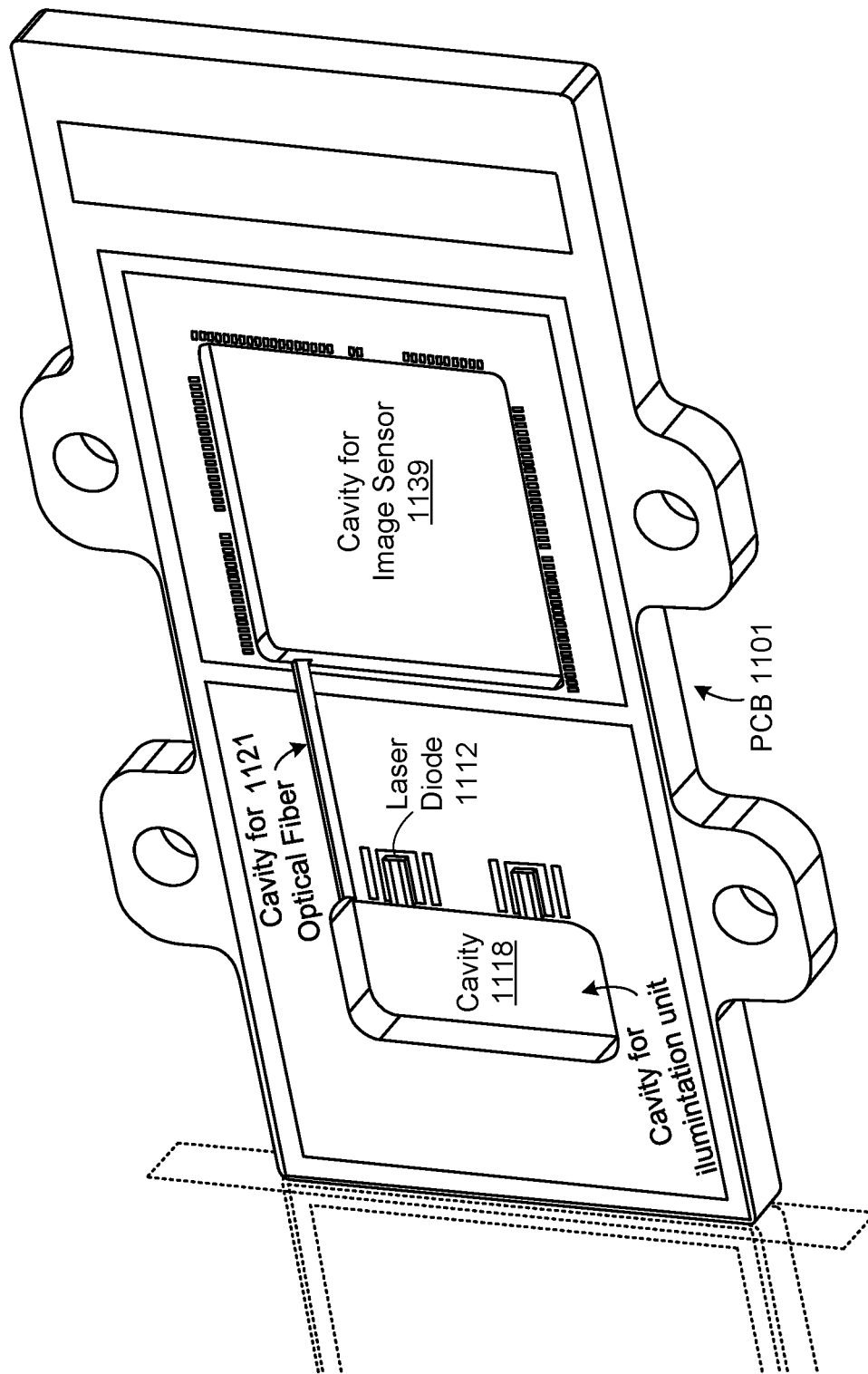
FIG. 17 is a perspective view diagram illustrating the printed circuit board (PCB) of the time-of-flight (TOF) imaging system with fiber optic feedback for calibration according to an embodiment of the present invention.

FIG. 17 is a perspective view diagram illustrating the printed circuit board (PCB) 1101 of the time-of-flight (TOF) imaging system 1100 with fiber optic feedback for calibration according to an embodiment of the present invention. As shown in FIG. 17, PCB 1101 includes a first cavity 1118 for the illumination unit, a second cavity 1139 for the image sensor, and a third cavity 1121 for the optical fiber. FIG. 17 also illustrates a laser diode 1112 disposed on PCB 1101.

Figure 18:
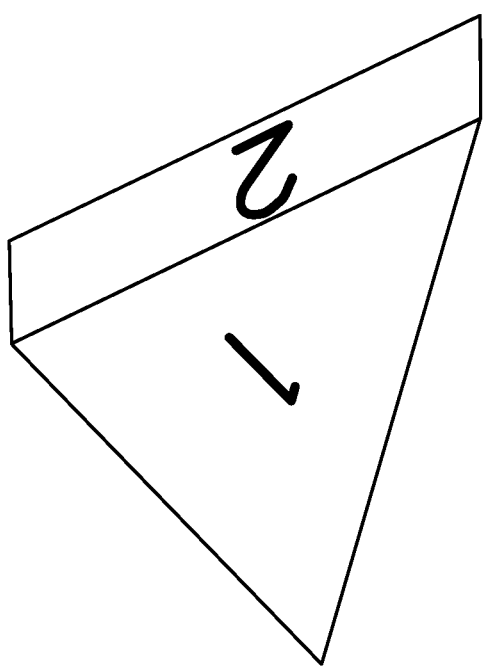
FIG. 18 is a perspective view diagram illustrating a prism 1138 that can be used in the time-of-flight (TOF) imaging system 1100 with fiber optic feedback for calibration according to an embodiment of the present invention.

FIG. 18 is a perspective view diagram illustrating a prism 1138 that can be used in the time-of-flight (TOF) imaging system 1100 with fiber optic feedback for calibration according to an embodiment of the present invention. In some embodiments, the prism can be made of glass, or other suitable transparent optical material. The prism has a top surface and a bottom surface, both labeled as surface "1," and three side surfaces each labeled as surface "2." As illustrated in FIGS. 11-16, the light from the optical fiber enters the prism through one of the side surfaces 2 and exits through the bottom surface 1 to be coupled into the pixel array in the image sensor. Therefore, in some embodiments, the top surface and two of the side surfaces of the prism are coated with reflective coating. The bottom surface and one of the side surfaces are uncoated and remains clear to allow the light from the optical fiber to enter the prism through a side surface and exit the prism through the bottom surface. In some embodiments, the prism is glued with a transparent adhesive to the pixel array and then coated with an opaque paste to isolate the feedback optics from the imaging optics.

In some embodiments, such as those illustrated in FIGS. 11, 12, and 16, optical fiber 1120 is coupled to the hypotenuse of the prism 1138, and a short side of the prism is disposed to overlap with the pixel array. A simulation study shows that in these embodiments, about 5.8% of the light coming through the fiber reaches the pixels area. In other embodiments, such as those illustrated in FIGS. 13 and 14, optical fiber 1120 is coupled to a short side of the prism 1138, and the hypotenuse of the prism is disposed to overlap with the pixel array. A simulation study shows that in these embodiments, about 8.7% of the light coming through the fiber reaches the pixels area.

Figure 19:
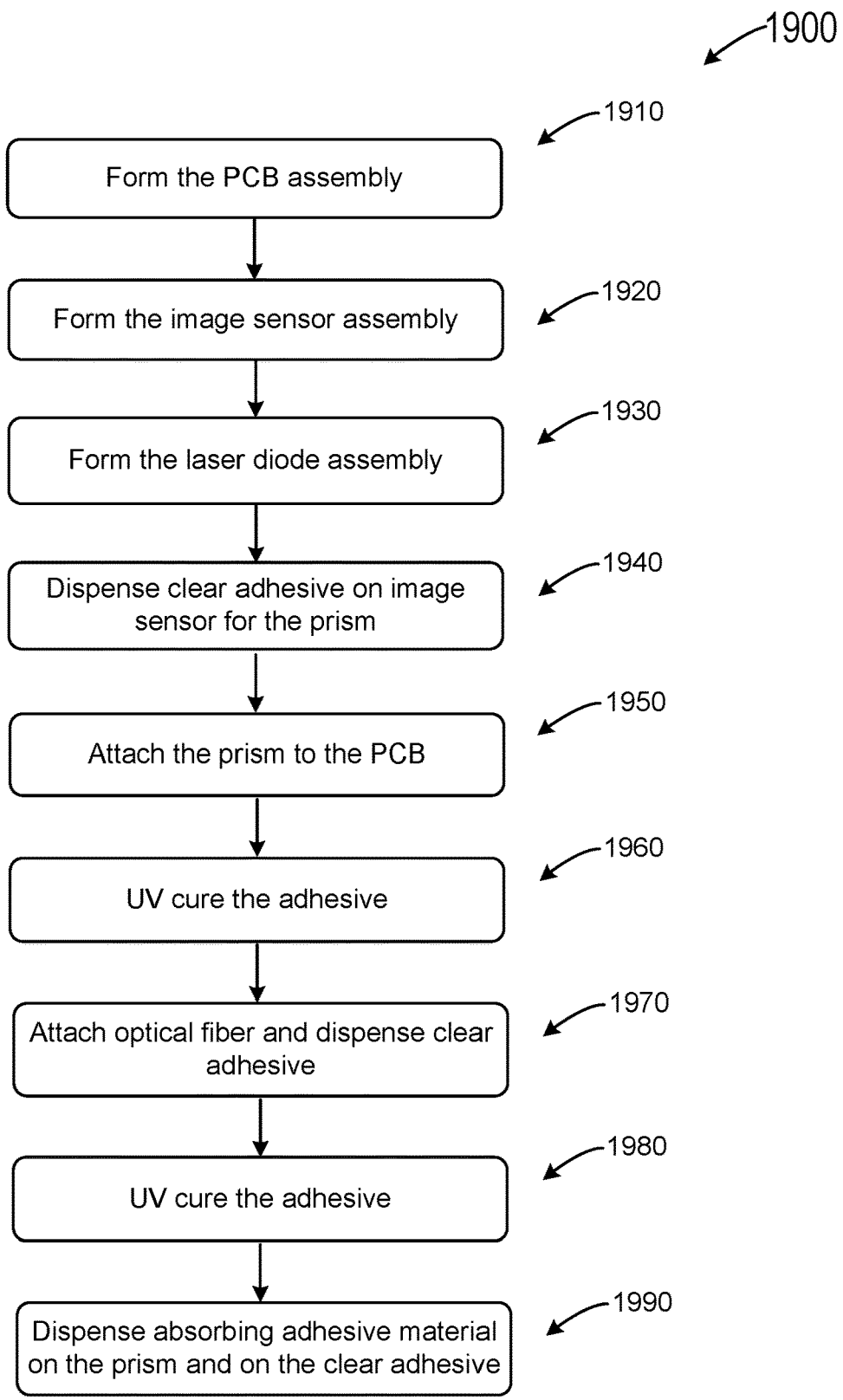
FIG. 19 is a flowchart illustrating a method for forming a time-of-flight (TOF) imaging system with fiber optic feedback for calibration according to an embodiment of the present invention.

FIG. 19 is a flowchart illustrating a method for forming a time-of-flight (TOF) imaging system with fiber optic feedback for calibration according to an embodiment of the present invention. In process 1910, the method includes forming the PCB assembly. The method includes forming the image sensor assembly by chip-on-board (CoB), in process 1920. In process 1930, the laser diode assembly is formed by chip-on-board (CoB). The method includes dispense clear adhesive on image sensor for the optical feedback (OFB) prism in process 1940. The OFB prism refers to optics that folds a direct light from the illumination unit into the field of view (FOV) of the lens. Next, the prism is attached to the PCB, in process 1950, and the adhesive is cured using a UV cure process (1960). The method also includes attaching optical fiber and dispensing clear adhesive during the attach time, in process 1970, and performing UV cure in process 1980. Further, in process 1990, the method includes dispensing absorbing adhesive material on the prism and on the clear adhesive.

In some embodiments, the optical fiber can be a 250 optical grade unjacketed plastic optical fiber. Other suitable optical fiber can also be used in alternative embodiments. The adhesive material mentioned above can be a precision positioning optical adhesive or a suitable alternative adhesive material.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A time-of-flight (TOF) imaging system, comprising:
    an illuminator to transmit light pulses to illuminate a target object for determining a distance to the target object;
    an image sensor having a light-sensitive pixel array to receive optical signals from the light pulses, the pixel array including an active region and a feedback region; and
    an optical feedback device for directing a portion of the light from the illuminator to the feedback region of the pixel array, the optical feedback device including a preset reference depth;
    wherein the imaging system is configured to:
    in a calibration period,
        transmit a group of calibration light pulses to illuminate the target object;
        sense, in the feedback region of the pixel array, light from the optical feedback device, using a sequence of calibration shutter windows characterized by delay times representing a range of depth; and
        calibrate TOF depth measurement reference information based on the sensed light in the feedback region of the pixel array;
    in a measurement period,
        transmit a first measurement light pulse to illuminate the target object;
        sense, in the active region of the light-sensitive pixel array, light reflected from the target object, using a first measurement shutter window with a first measurement delay time relative to the first measurement light pulse;
        transmit a second measurement light pulse to illuminate the target object;
        sense, in the active region of the light-sensitive pixel array, light reflected from the target object, using a second measurement shutter window with a second measurement delay time relative to the second measurement light pulse; and
        determine the distance of the target object based on light sensed using the first measurement shutter window and the second measurement shutter window and the calibrated TOF depth measurement reference information.

2. The system of claim 1, wherein the sequence of calibration shutter windows comprises a first series of calibration windows and a second series of calibration windows, and delay times associated with the second series of calibration windows are offset from delay times associated with the first series of calibration windows by a width of the shutter window.

3. The system of claim 2, wherein calibrating time-of-flight depth measurement reference information comprises associating the range of depth with ratios of light signals sensed using the first series of calibration windows and the second series of calibration windows.

4. The system of claim 2, wherein the second measurement delay time is offset from the first measurement delay time by the width of the shutter window.

5. The system of claim 3, wherein determining the distance of the target object comprises comparing a ratio of sensed light signals using the first measurement delay time and the second measurement delay time with the time-of-flight depth measurement reference information.

6. The system of claim 2, wherein the optical feedback device comprises an optical fiber configured to couple light from inside an illuminator housing to the feedback region at a corner of the pixel array.

7. The system of claim 5, wherein the TOF measurement reference information comprises a look-up table correlating a distance of an object to a ratio between two sampled light signals sensed using the first series of calibration windows and the second series of calibration windows.

8. The system of claim 1, wherein the calibration period and the measurement period are included in a single frame period.

9. The system of claim 1, wherein calibration takes about 1/300 of a frame period.

10. The system of claim 1, further comprising multiple illumination sources and corresponding optical feedback regions.

11. The system of claim 1, wherein the imaging system is configured to calibrate time-of-flight, TOF, depth measurement reference information after sensing, in the active region of the light-sensitive pixel array, light reflected from the target object.

12. A method for calibrating a time-of-flight (TOF) camera system, comprising:
   transmitting a group of calibration light pulses to illuminate a target object;
   sensing, in a first region of a light-sensitive pixel array, light provided from an optical feedback device that receives a portion of the group of calibration light pulses, using a sequence of calibration shutter windows characterized by delay times relative to the calibration light pulses representing a range of depth, the optical feedback device characterized by a preset reference depth;
   calibrating TOF depth measurement information based on the light provided from the feedback optic device;
   transmitting a first measurement light pulse to illuminate the target object;
   sensing, in a second region of the light-sensitive pixel array, light reflected from the target object, using a first measurement shutter window with a first measurement delay time relative to the first measurement light pulse;
   transmitting a second measurement light pulse to illuminate the target object;
   sensing, in the second region of the light-sensitive pixel array, light reflected from the target object, using a second measurement shutter window with a second measurement delay time relative to the second measurement light pulse; and
   determining a distance of the target object based on light sensed using the first measurement shutter window and the second measurement shutter window and the calibrated TOF depth measurement information.

13. The method of claim 12, wherein the sequence of calibration shutter windows comprises a first series of calibration windows and a second series of calibration windows, and delay times associated with the second series of calibration windows are offset from delay times associated with the first series of calibration windows by a width of the shutter window.

14. The method of claim 13, wherein calibrating TOF depth measurement reference information comprises associating the range of depth with ratios of light signals sensed using the first series of calibration windows and the second series of calibration windows.

15. The method of claim 14, wherein the TOF depth measurement reference information comprises a look-up table correlating a distance of an object to a ratio between two sampled light signals using the first series of calibration windows and the second series of calibration windows.

16. In a digital camera characterized by a preset frame rate, a method, comprising:
   in a single frame period determined by the preset frame rate,
   transmitting calibration light pulses to illuminate a target object;
   sensing, in a first region of a light-sensitive pixel array, light provided from an optical feedback device that receives a portion of the transmitted light pulses, the feedback optical device including a preset reference depth, wherein the light from the optical feedback device is sampled using a sequence of shutter windows that includes delay times relative to the transmitted calibration light pulses representing a range of distance;
   calibrating time-of-flight (TOF) depth measurement reference information based on the sensed light in the first region of the pixel array;
   transmitting measurement light pulses to illuminate a target object;
   sensing, in a second region of the light-sensitive pixel array, light reflected from the target object from the transmitted light pulses using a measurement shutter windows with delay times relative to the measurement light pulses; and
   determining a distance of the target object based on the sensed light reflected from the target object and the calibrated TOF measurement reference information.

17. The method of claim 16, wherein the optical feedback device comprises an optical fiber.

18. The method of claim 17, wherein the optical fiber is configured to couple light from inside an illuminator housing to the first region at a corner of the pixel array.

19. The method of claim 16, wherein, wherein the TOF measurement reference information comprises a look-up table correlating distance of an object to a ratio between two sampled light signals using two shutters with different time delays.

20. The method of claim 16, wherein sensing light reflected from the target object comprises sensing light using two shutters with different time delays with respect.

* * * * *